United States Patent [19]
Casper et al.

[11] Patent Number: 5,101,477
[45] Date of Patent: Mar. 31, 1992

[54] SYSTEM FOR HIGH SPEED TRANSFER OF DATA FRAMES BETWEEN A CHANNEL AND AN INPUT/OUTPUT DEVICE WITH REQUEST AND BACKUP REQUEST COUNT REGISTERS

[75] Inventors: Daniel F. Casper, Poughkeepsie; John R. Flanagan, Staatsburg; Thomas A. Gregg, Highland; Catherine Che-wen Huang, Poughkeepsie, all of N.Y.; Matthew J. Kalos, Tucson, Ariz.

[73] Assignee: International Business Machines Corp., Armonk, N.Y.

[21] Appl. No.: 481,071

[22] Filed: Feb. 16, 1990

[51] Int. Cl.$^5$ .................................................. G06F 7/06
[52] U.S. Cl. .............................. 395/250; 364/239.7; 364/939.3; 364/939.2; 364/239.3
[58] Field of Search .................................. 364/200, 900

[56] References Cited

U.S. PATENT DOCUMENTS

| | | | |
|---|---|---|---|
| 3,704,453 | 11/1972 | Blackwell et al. | 340/172.5 |
| 4,006,465 | 2/1977 | Cross et al. | |
| 4,115,854 | 9/1978 | Capowski et al. | |
| 4,131,940 | 12/1978 | Moyer | |
| 4,241,398 | 12/1980 | Carll | |
| 4,284,953 | 8/1981 | Hepworth et al. | |
| 4,527,237 | 7/1985 | Frieder et al. | 364/200 |
| 4,613,954 | 9/1986 | Sheth | |
| 4,646,261 | 2/1987 | Ng | 364/200 |
| 4,675,864 | 6/1987 | Bliek et al. | |
| 4,841,475 | 6/1989 | Ishizuka | 364/900 |
| 4,860,193 | 8/1989 | Bentley et al. | |
| 4,860,244 | 8/1989 | Bruckert et al. | |
| 4,866,609 | 9/1989 | Calta et al. | |
| 4,949,333 | 8/1990 | Gulick et al. | 370/32 |

OTHER PUBLICATIONS

Non-Disclosure Agreement dated Apr. 27, 1988.
Non-Disclosure Agreement Dated Aug. 4, 1988.
Non-Disclosure Agreement Dated Oct. 10, 1988.
Supplement to Agreement for Receipt of IBM Confidential Information Effective Date Dec. 21, 1988.

Primary Examiner—Michael R. Fleming
Assistant Examiner—Robert S. Hauser
Attorney, Agent, or Firm—Floyd A. Gonzalez

[57] ABSTRACT

A data transfer apparatus for use in transferring data frames between a data buffer and an input/out (I/O) device in a data processing system. A channel in the data processing system includes an inbound frame header buffer for storing a header from an inbound data frame from the I/O device, an outbound frame header buffer for building a header for an outbound data frame to be sent to the I/O device, a data buffer for storing data transmitted between the data processing system and the I/O device, and a data transfer control circuit for controlling the number of data bytes to be transferred between the data buffer and the I/O device. The channel also includes a microcode routine controlled microprocessor for analyzing frame headers in the inbound frame header buffer, for building frame headers in the outbound frame header buffer, for initiating the transmission of outbound frames, and for controlling the data transfer control circuit for transferring a desired number of data bytes.

23 Claims, 19 Drawing Sheets

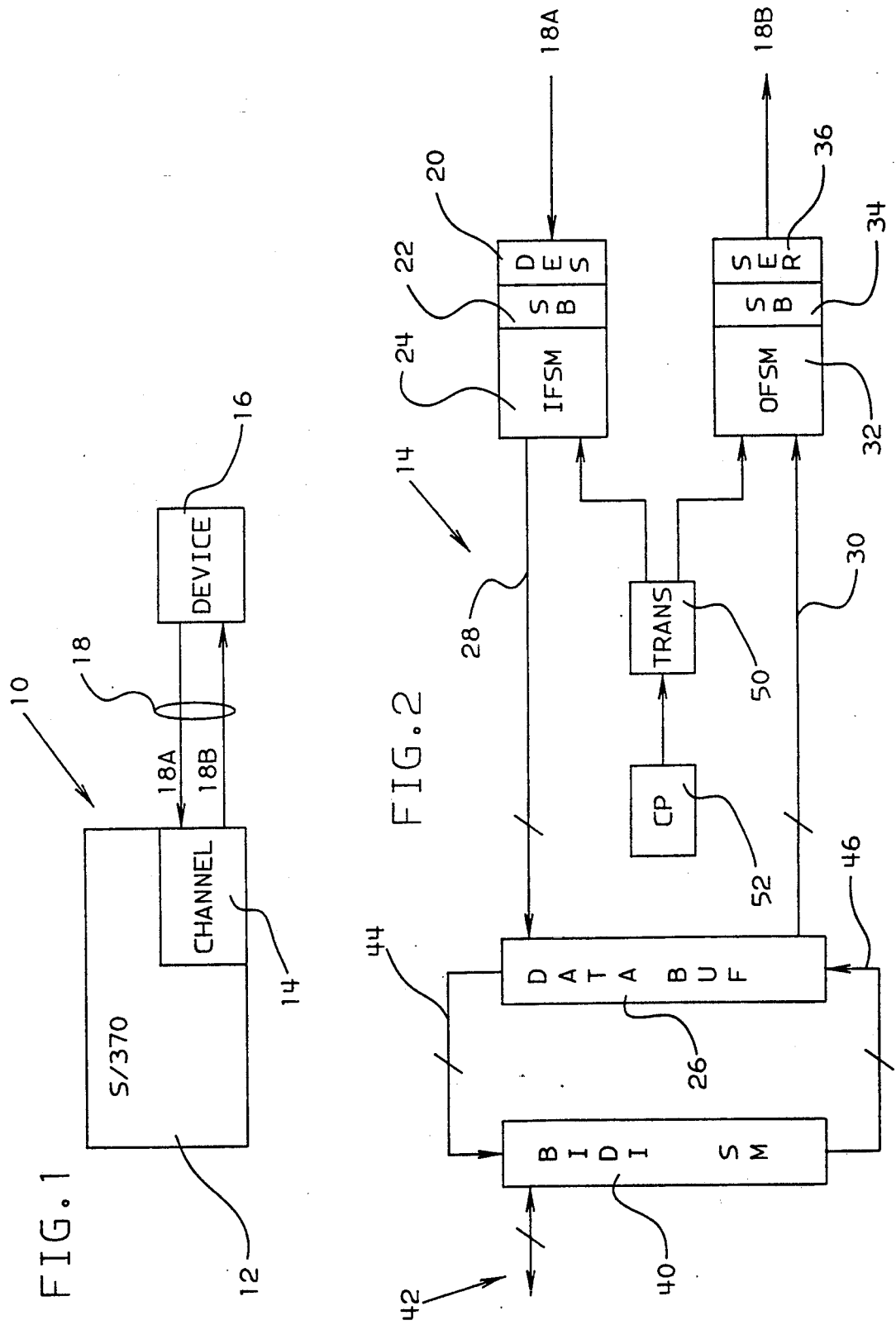

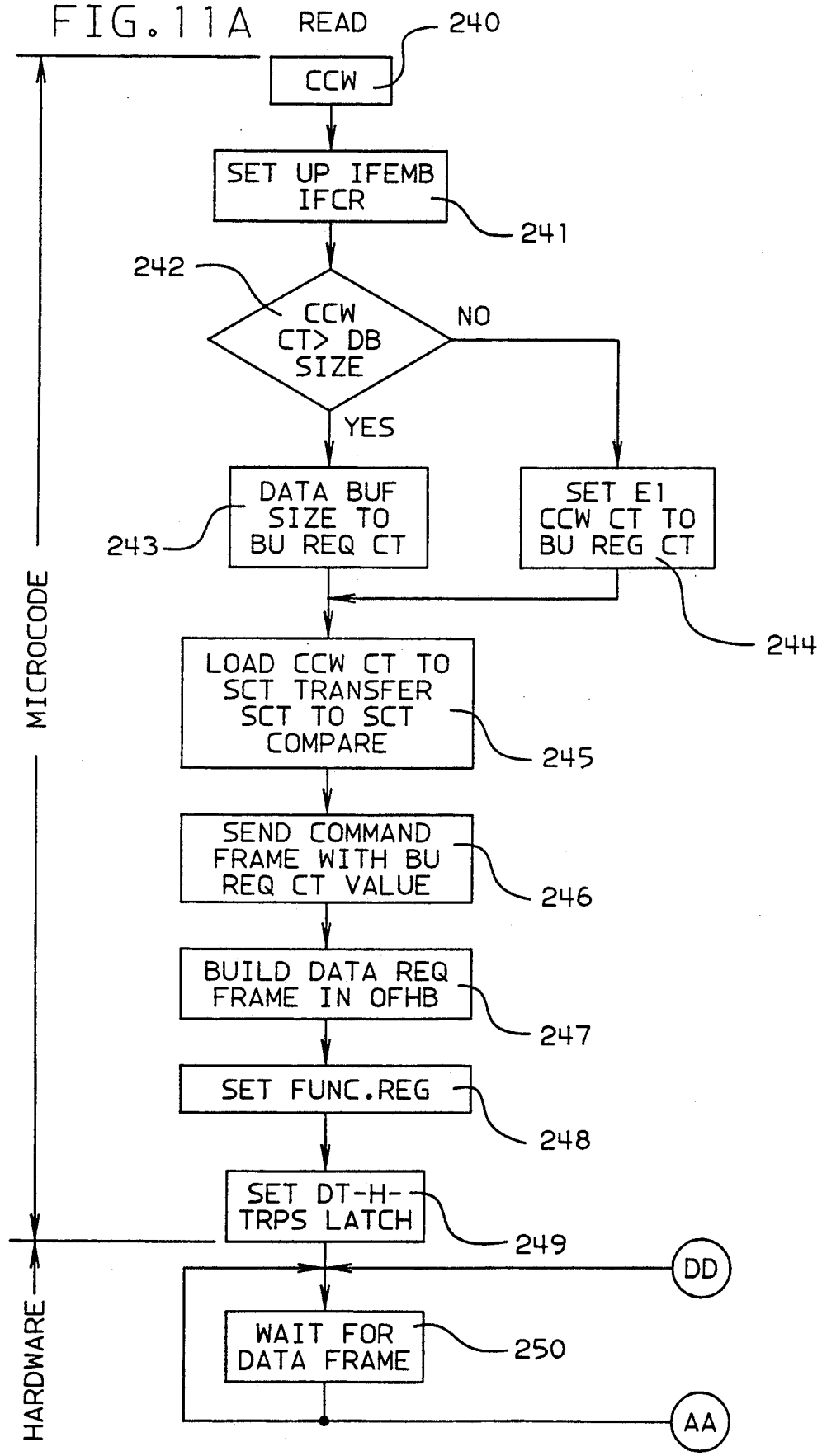

SYSTEM FOR HIGH SPEED TRANSFER OF DATA FRAMES BETWEEN A CHANNEL AND AN INPUT/OUTPUT DEVICE WITH REQUEST AND BACKUP REQUEST COUNT REGISTERS

This invention is related to the transfer of data frames between a channel and an input/output (I/O) device in a data processing system, and is more particularly related to a high speed data frame transfer system which reduces that portion of the available bandwidth of the engine needed to make data frame transfers between a channel and an I/O device.

It is well known that data messages transmitted over a data link in a data processing system are preceded and followed by header and trailer fields for specifying the contents of the data message. These header and trailer fields typically are made up of special characters which may be independently recognized by a receiver of the message. In high speed data links, it is desirable to construct the header and trailer fields using special purpose hardware, while controlling transmission of data with a channel processor.

U.S. Pat. No. 4,006,465 issued Feb. 1, 1977 for "Apparatus For Control and Data Transfer Between a Serial Data Transmission Medium and a Plurality of Devices" to Cross et al, discloses an apparatus under a microprocessor control for use in communicating over a serial communication loop with a remote attached control unit. The disclosed apparatus is capable of establishing frame synchronization, interpreting commands, assembling data and transmitting bits on the loop. For output operations to a device, the microprocessor loads the device address and a device command or data into shift registers, and initiates the transfer by setting a latch.

U.S. Pat. No. 4,241,398 issued Dec. 23, 1980 for "Computer Network, Line Protocol System" to Carll, discloses a low overhead line protocol format for controlling the asynchronous exchange of digital signal information between a central processing unit and one or more remote processing units of a supervisory control system. Digital signal information is converted into serial bits and organized into bit cells in the information field of one or more serial data frames of a message unit, each frame including a header field and a trailer field.

U.S. Pat. No. 4,284,953 issued Aug. 18, 1981 for "Character Framing Circuit" to Hepworth et al, discloses a digital logic circuit which provides character framing for a continuous stream of synchronous serial data characters.

U.S. Pat. No. 4,675,864 issued June 23, 1987 for "Serial Bus System" to Bliek et al, discloses a serial bus system in which frames are sent from a central station to a plurality of substations over a first conductor, and information is sent from the substation to the central station over a second conductor. Each transmitted frame contains bits identifying whether it is for address, data or a command.

The transfer of data between a channel data buffer and an I/O device is well known. U.S. Pat. No. 4,115,854 to Capowski et al for "Channel Bus Controller" issued Sept. 19, 1978 and discloses a channel bus controller for transferring information between groups of input/output channels and processor storage wherein the transfer sequence may be different from the input sequence.

U.S. Pat. No. 4,131,940 to Moyer for "Channel Data Buffer Apparatus For a Digital Data Processing System" issued Dec. 26, 1978 and discloses buffering data being transferred between an input/output channel unit and a main storage unit in a data processing system. In the disclosed embodiment, the data buffer/main storage data transfer circuitry makes use of an eight byte wide flow through type buffer shifter which is located in an instruction processing unit. The elemental operations performed in the instruction processing unit are controlled by a microprogrammed primary or main control unit.

U.S. Pat. No. 4,613,954 to Sheth for "Block Counter System to Monitor Data Transfers" issued Sept. 23, 1986 and discloses a system for transferring data between a peripheral terminal unit and a main host computer. A sensing means counts the number of words addressed in the buffer memory, and senses whether a Read or Write operation is occurring and whether the data word transfer is a buffer-to-host transfer or a buffer-to-peripheral unit transfer. This information is processed by a block counter logic unit and gating means to constantly update a block counter which keeps tally of the number of data blocks residing in the buffer memory. The block counter provides information to a common front end microcode sequencer as to memory status so that the common front end can select appropriate programs of action.

U.S. Pat. No. 4,860,193 to Bentley et al for "System For Efficiently Transferring Data Between a High Speed Channel and a Low Speed I/O Device" issued Aug. 22, 1989 and discloses a buffer memory used to store data from the I/O device arrayed corresponding to the data rate of the I/O device. A threshold is selected for beginning an unload cycle of the buffer memory which will permit higher channel data rate transfers to the channel.

U.S. Pat. No. 4,860,244 to Bruckett et al for "Buffer System For Input/Output Portion of Digital Data Processing System" issued Aug. 22, 1989 and discloses a data transfer system wherein a controller begins to transfer data between a memory and an input/output system after a block of data has been stored in a buffer.

U.S. Pat. No. 4,866,609 to Calta et al for "Byte Count Handling in Serial Channel Extender With Buffer For Data Pre-Fetch" issued Sept. 12, 1989 and discloses a channel subsystem having a buffer and a channel outbound box. The channel subsystem has counters for maintaining the correct byte count from a system of count and status frames for sending byte count and other status information between the channel and the outbound box.

SUMMARY OF THE INVENTION

A data transfer apparatus is disclosed for use in transferring data frames between a data buffer to an I/O device in a data processing system. A channel in the data processing system includes an inbound frame header buffer for storing a header from an inbound data frame from the I/O device, an outbound data frame buffer for building a header for an outbound data frame to be sent to the I/O device, a data buffer for storing data transmitted between the data processing system and the I/O device, and a data transfer control circuit for controlling the number of data bytes to be transferred between the data buffer and the I/O device. The channel further includes a microcode routine controlled microprocessor for analyzing frame headers in the inbound frame header buffer, for building frame headers in the outbound frame header buffer, for initiating the transmission of outbound frames, and for controlling the data transfer control circuit for transferring a desired number of data bytes.

It is therefore a principle object of the present invention to provide a data transfer apparatus having an inbound frame header buffer, an outbound frame header buffer, a data buffer and a request counter, all controlled by a microcode controlled microprocessor, wherein the data transfer apparatus results in a high speed data transfer system which reduces that portion of the available bandwidth of the engine needed to make data frame transfers.

It is another object of the present invention to provide for updating the number of data bytes to be transferred in a request counter with the microprocessor, as desired.

It is another object of the present invention to provide comparitors which are accessible by the microprocessor for determining which data frame will complete a requested data transfer.

It is another object of the present invention to provide a programmable comparitor for providing initiative to the microcode routine to start a new data request when there is sufficient space available in the data buffer to accept the number of data bytes that will be requested by the new data request.

It is another object of the present invention to provide a frame set up register which, when set in a read operation, instructs the microprocessor to start a new data request, and which, when set during a write operation, provides an initiative to the microprocessor to set up and start transmission of a new data frame.

The foregoing and other objects, features and advantages of the invention will be apparent from the following more particular description of the preferred embodiment of the invention as illustrated in the drawings.

BRIEF DESCRIPTION OF THE DRAWINGS

FIG. 1 is an overall view of a data processing system having a channel, a remote device, and a data link between the channel and device;

FIG. 2 is a block diagram of the channel of FIG. 1 in which the channel includes a data buffer, an inbound frame state machine for decoding inbound frames, an outbound frame state machine for constructing frames to be placed on the data link, a processor, and a transfer control circuit for controlling the transfer of data from the data buffer to the outbound frame state machine and from the inbound frame state machine to the data buffer;

FIGS. 11A, 11B and 11C joined at connectors AA, BB, CC and DD, form a flow chart showing the operation of the hardware and microcode of the invention during a read operation;

DESCRIPTION OF THE PREFERRED EMBODIMENT

Figure 3:
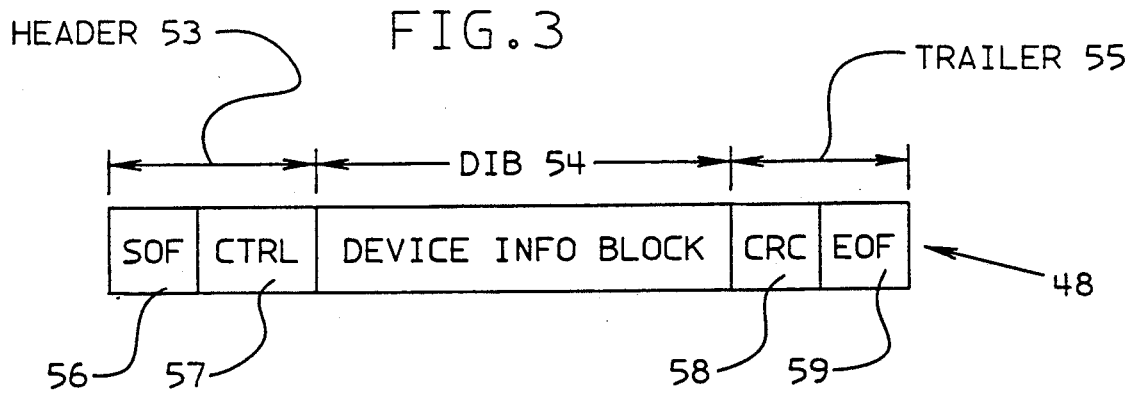
FIG. 3 illustrates a data frame having a header, a device information block and a trailer.

FIG. 1 is an overall view of a data processing system 10 usable with the present invention. The data processing system 10 includes a computer 12 such as, for instance, an IBM System/370 machine, which further includes one or more channels 14 having data input and output capabilities. The channel 14 is connected by a data link 18 to a device 16. In the preferred embodiment, the data link 18 includes an input conductor 18A for providing data transmissions from the device 16 to the channel 14, and an output conductor 18B which provides for data transmission from the channel 14 to the device 16. The device 16 may be a peripheral device, a control unit controlling several peripheral devices, or a switch device which provides for switching the data link 18 to any one of a number of control units or devices. The device 16 is referred to herein as an I/O device. Channel commands are sent by the computer 12 to the channel 14 by a channel command word (CCW), in a manner well known in the art.

FIG. 2 is a block diagram of the channel 14 of the data processing system of FIG. 1. The input conductor 18A provides data to a deserializer circuit 20 whose output is connected to an input synchronizer buffer 22. The synchronizer buffer 22 is connected to an inbound frame state machine (IFSM) 24. The synchronizer buffer 22 provides an interface between the deserializer circuit 20 and the inbound frame state machine 24 such that data may be received by deserializer circuit 20 at a different rate than it is processed by the inbound frame state machine 24. Data from the inbound frame state machine 24 is provided to a data buffer 26 over a multibit data bus 28. On the output side, data from the data buffer 26 is transmitted over a multibit data bus 30 to an outbound frame state machine 32, whose output is connected to an outbound synchronizing buffer 34. Data from the outbound synchronizing buffer 34 is provided to a serializer circuit 36, whose output is connected to the output conductor 18B of the data link 18. The data buffer 26 is connected to a bidirectional state machine 40 which controls data transfers between the system bus 42 of the computer 12 and the data buffer 26 over input and output intermediate data busses 44 and 46, respectively.

In the preferred embodiment, input data over input conductor 18A and output data over output conductor 18B is organized in data frames containing a start of frame (SOF) header and an end of frame (EOF) trailer. Also transmitted over the data link 18 are certain control frames for controlling and reporting the status of the device 16. These control frames also have start of frame headers and end of frame trailers. The inbound frame state machine 24 decodes the incoming frames to divide incoming data from device commands, and the outbound frame state machine 32 constructs the outbound data and command frames. In the preferred embodiment, the decoding and building of frames by the inbound state machine 24 and the outbound frame state machine 32, respectively, is performed, where possible, by hardware contained in a transfer circuit 50 for speed of operation. Certain registers and counters and the transfer circuit 50 and the state machines 24 and 32 are loaded and controlled by a channel processor 52.

FIG. 3 illustrates a data frame 48 such as those transferred by the present invention. The data frame includes a header 53, a device information block (DIB) 54, and a trailer 55. The header 53 includes a start of frame (SOF) sequence 56, and control characters or bits 57. The DIB 54 may include or be made up entirely of data as desired. The trailer 55 includes a cyclic redundancy character (CRC) for error detection and correction, and an end of frame (EOF) sequence 59. As will be described, the present invention includes means to detect when the header has been transmitted such that the header 53 may be separated from the DIB 54 on the fly or in real time. Reference will also be made to command frames which are similar to the frame of FIG. 3 except that they do not contain a DIB 54.

Figure 4A:
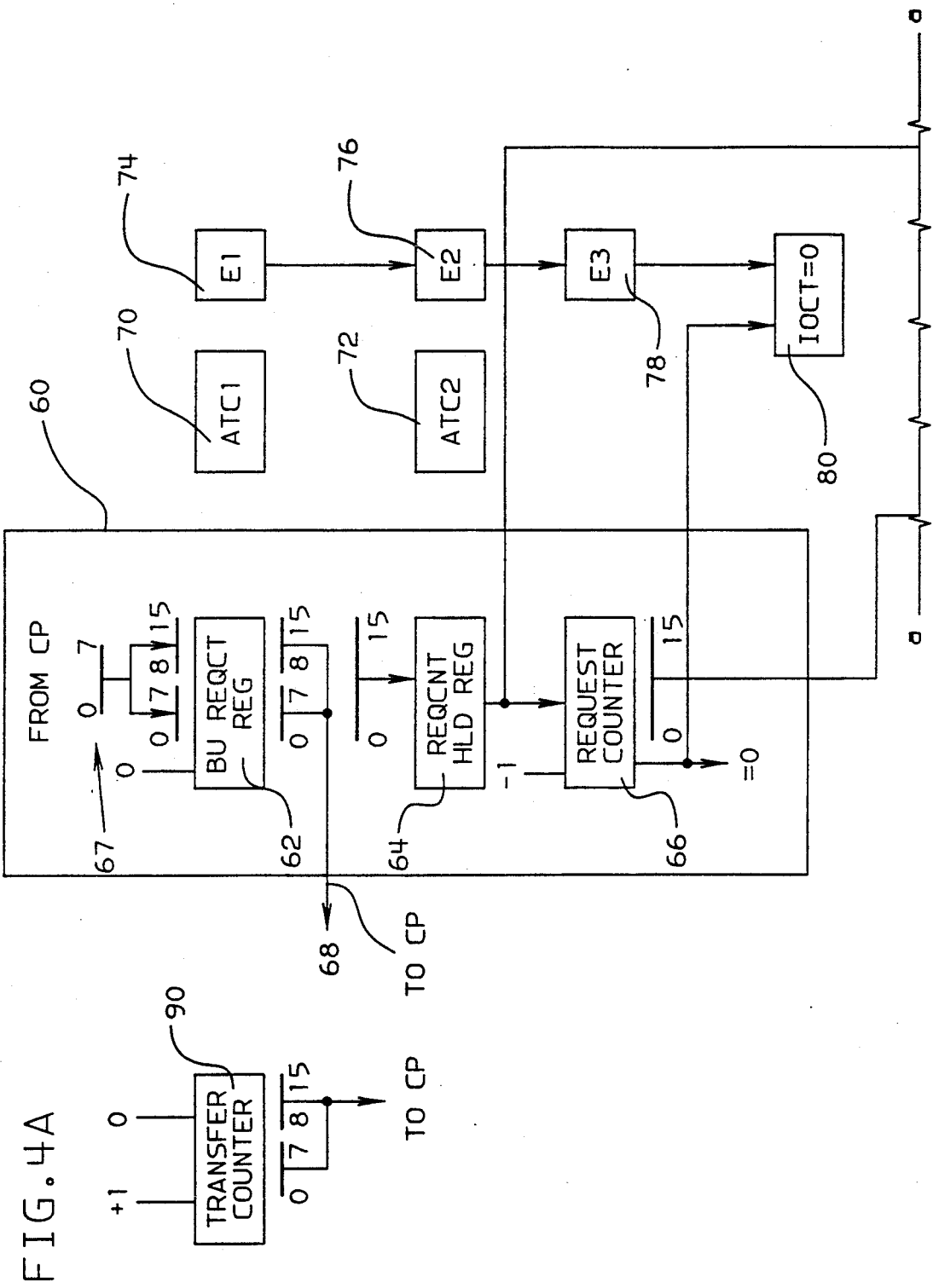
FIGS. 4A and 4B, joined along line a-a, form a block diagram of a portion of the transfer control circuit of FIG. 2.
Figure 4B:
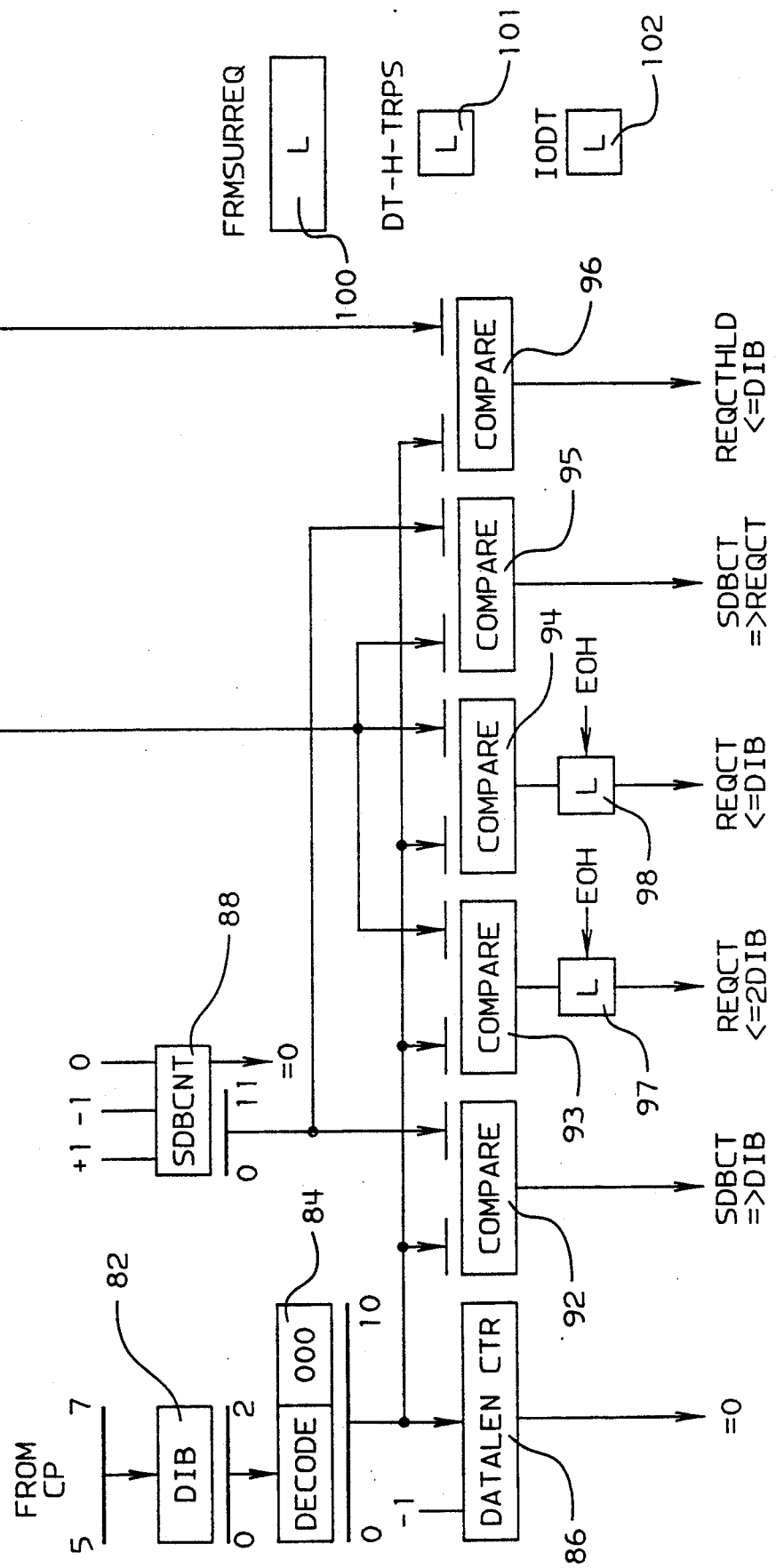

FIGS. 4A and 4B form a block diagram of a portion of the hardware circuit of the transfer control circuit 50 of FIG. 2. A stack of request count registers 60 is provided to control the transfer of data in a data frame during read or write operations. The stack 60 includes a backup request count register (BU REQCT REG) 62, a request hold register (REQENT HLD REQ) 64 and a request counter 66. Allow transfer control 1 (ATC1) latch 70 and allow transfer control 2 (ATC2) latch 72 are provided to indicate when the contents of the backup request count register 62 and the request hold register 64, respectively, are valid.

The backup request count register 62 may be loaded with a request count in two bytes by the channel processor 52 at input 67, and may be read by the channel processor 52 via an output 68. The backup request count register 62 is transferred to the request count hold register 64 whenever the ATC1 latch 70 is set and the ATC2 latch 72 is reset or is being reset.

When the backup request count register 62 is transferred to the request count hold register 64, the backup request count register 62 is reset to all zeros. Thus, when the channel processor 52 makes an update to the backup request count register, it may do so by unconditionally adding the new value to the current value of the backup request count register 62. The request hold register 64 provides a reserve count to allow the continued sending or receiving of a data frame uninterrupted as the backup request count register 62 is being updated by the channel processor 52.

Figure 6:
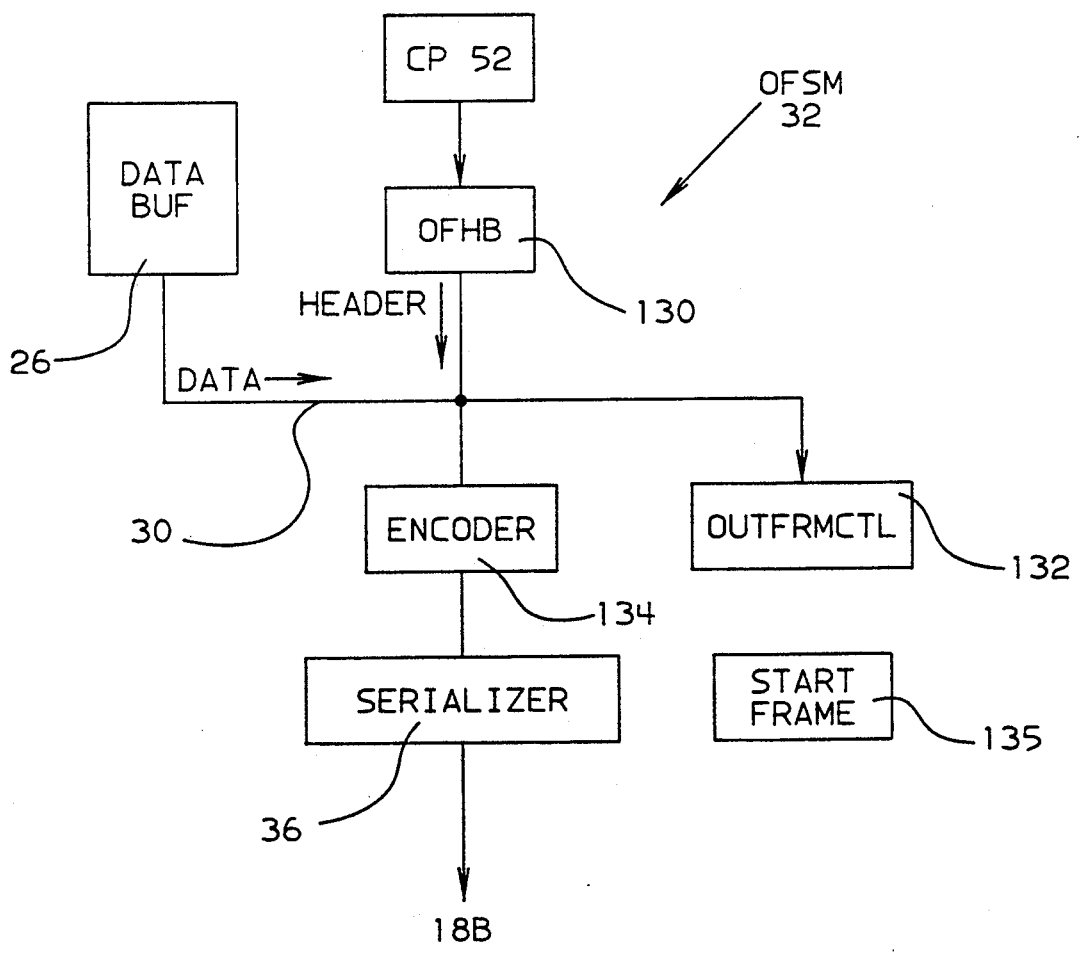
FIG. 6 is a block diagram of a portion of the outbound frame state machine of FIG. 2.

The request counter 66 is loaded from the request count hold register 64. The request counter 66 is decremented for each data byte transferred into and out of the data buffer 26 to or from the I/O device. For write operations, the value in the request count hold register 64 is transferred to the request counter 66 when the ATC2 latch 72 is set, a start frame latch 135, to be discussed in connection with FIG. 6, is set and the value in the request counter 66 is set to zero. When the request counter 66 decrements to zero during transmission of a data frame, the transmission of the data portion 54 of the frame will be terminated and the trailer 55 will be appended.

For read operations, the value in the request count hold register 64 is transferred to the request counter 66 when the ATC2 latch 72 is set and the value in the request counter 66 is equal to zero, or equal to one and decrementing. In this way, a single inbound data frame can span the values in the request counter 66 and the request count hold register 64 without interruption. If a data byte is received when the value in the request counter 66 is one and the ATC2 latch 72 is not set, the request counter decrements to zero. If the data byte is received when the value in the request counter is zero, an error entry is made in an inbound frame header buffer 107 of FIG. 5, to be discussed.

E1 latch 74, E2 latch 76 and E3 latch 78 track the end request count through the registers 60, 62 and 64, respectively. An IOCT=0 latch 80 is connected to the E3 latch 78 and the request counter 66, and is set when the E3 latch is set and the request counter 66 is equal to zero or equal to one and decrementing. The IOCT=0 latch 80 indicates to the hardware and microcode that all of the data specified by the current CCW count has been transferred to or from the I/O device.

A DIB register 82 of FIG. 4B is loaded by the CP 52 with a count which represents the size of the DIB 54 of the data frame 48 being transmitted. The contents of the DIB register 82 is decoded by a decoder 84. The output of the decoder 84 is used for various compares, as will be discussed.

A data length counter (DATALEN CTR) 86 is loaded by the decoder 84, and is decremented for each data byte transmitted in a data frame 48 during write operations. When the count from the decoder 84 equals zero, the data portion of the outbound data frame 48 is terminated and the trailer 55 is appended. For read operations, the data length counter 86 can be used to check the DIB size of an inbound frame.

A serial data buffer counter (SDBCNT) 88 keeps a running count of the data bytes in the data buffer 26. After being set to zero, the serial data buffer counter 88 is incremented for each byte written into the data buffer 26, and decremented for each byte read. The channel processor 52 may be programmed to either detect an error or to terminate the data portion of the data frame and append the trailer when the counter 88 prematurely goes to zero during the transmission of an outbound data frame, as desired.

A transfer counter 90 of FIG. 4A is incremented by one for each data byte transmitted or received in a data frame and is used by the microcode to verify the integrity of the data transfer for each CCW by comparing the number of data bytes transferred by the channel to the number of data bytes transferred by the I/O device.

Comparitors 92–96 provide inputs into the hardware to determine if sufficient data has been fetched and provide branch points for the microcode as will be discussed. Comparitor 92 determines if the count from the data buffer count from counter 88 is greater or equal to the DIB count from decoder 84 (SDBCT=>DIB). Comparitor 93 determines if the request count is less than or equal to twice the DIB size (REQCT<=2 DIB). Comparitor 94 determines if the request count is less than or equal to the DIB count (REQCT<=DIB). Comparitor 95 determines if the data buffer count is equal to or greater than the request count (SDBCT=> REQCT). Comparitor 96 determines if the count from the request count hold register 64 is less than or equal to the DIB count (REQCTHLD<=DIB). Latches 97 and 98 latch the value from the comparitors 93 and 94, respectively, at end-of-header (EOH) time. The OR of comparitors 92 and 95 is used to determine that sufficient data has been fetched into the data buffer 26 to satisfy the frame size requirement so that transmission of a frame may begin. The comparitors 93, 94 and 96 provide branch points for the microcode to determine how far the outbound data transfer has progressed.

Latches 101 and 102 may be set or reset by microcode to give instructions to the hardware, as will be explained. Latch 100 is a frame set up request (FRMSUREQ) latch and is set by hardware and reset by microcode, as will be explained. Latch 101 is a data transfer hardware traps (DT-H-TRPS) latch, and latch 102 is an I/O data transfer (IODT) latch.

Figure 5:
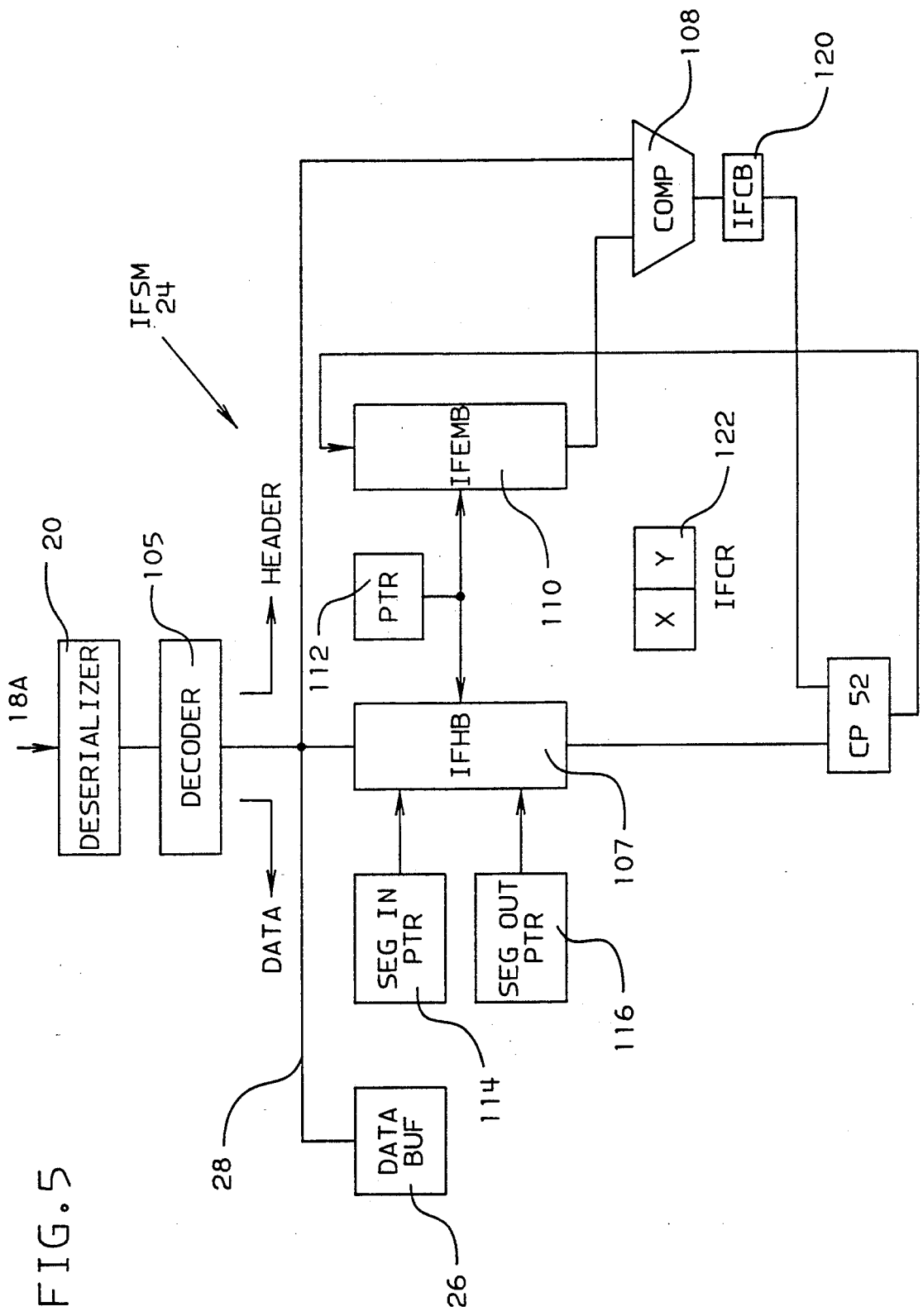
FIG. 5 is a block diagram of a portion of the inbound frame state machine of FIG. 2.

FIG. 5 is a block diagram of a portion of the inbound frame state machine 24 of FIG. 2. As discussed in connection with FIG. 2, an inbound link conductor 18A transmits frames from an I/O device to the deserializer 20. The output of the deserializer 20 is connected to a decoder 105 whose output is connected to the data buffer 26, an inbound frame header buffer (IFHB) 107, and a comparitor 108. Data from the inbound frame will be stored in the data buffer 26 while header data from the inbound frame will be stored in the inbound frame header buffer 107 and compared with expected header data stored in an inbound frame expect mask buffer (IFEMB) 110.

The inbound frame expect mask buffer 110 is a buffer containing the bit pattern of an expected header. The inbound frame header buffer 107 is a multiple segment buffer, with each segment storing a header from decoder 105. A pointer (PTR) 112 is incremented by the hardware to simultaneously point to the byte in the segment of the inbound frame header buffer 107 selected by a segment in pointer 114 (SEG IN PTR) and the corresponding byte in the inbound frame expect mask buffer 110. The SEG IN PTR 114 is incremented by the hardware when a frame or data frame header has been written into the current segment, and this frame is to be preserved for inspection by the microcode. A segment out pointer (SEG OUT PTR) 116 is incremented by the microcode when it has finished inspecting the frame. When segment pointers 114 and 116 are equal, the inbound frame header buffer 107 is empty. When the pointers are not equal, a microcode trap becomes pending to alert the microcode to the presence of a frame (or frames) in the buffer. This microcode trap will be explained further. An inbound frame compare buffer (IFCB) 120 holds the results of the comparisons of the headers in each segment of the inbound frame header buffer 107 with the expected header in the inbound frame expect mask buffer 110. Thus, if all of the bits in a given segment of the inbound frame compare buffer 120 are zero, the header received and stored in that segment of the inbound frame header buffer 107 is the same as the expected header stored in the inbound frame expect mask buffer 110. An inbound frame control register (IFCR) 122 has an X portion and a Y portion. The X portion of register 122 contains the value of the number of bytes which must compare equal for the incoming frame to be a data frame. The Y portion of the register 122 contains the header length, not counting the start of frame sequence. The use of these values will be explained further.

FIG. 6 is a block diagram showing the outbound frame state machine 32 wherein headers are built for the outbound data frame transmitted over link conductor 18B to an I/O device. The channel processor 52 builds a header in an outbound frame header buffer (OFHB) 130 in accordance with control bits in an outbound frame control register (OUTFRM CTL) 132. The outbound frame control register 132 contains bits which identify if the frame presently being built is to be a data frame, the types of delimiters to be used and the header length. After the header is built in the outbound frame header buffer 130 the header is sent to an encoder 134 whose output is serialized by the serializer 36 for transmission over the data link connector 18B. Data from the data buffer 26 is then transmitted over the conductor 30 and appended after the header from the outbound frame header buffer 130 to form the frame shown in FIG. 3. A start frame latch 135 may be set and reset by the channel processor 52 to instruct the hardware, as will be discussed.

Figure 7A:
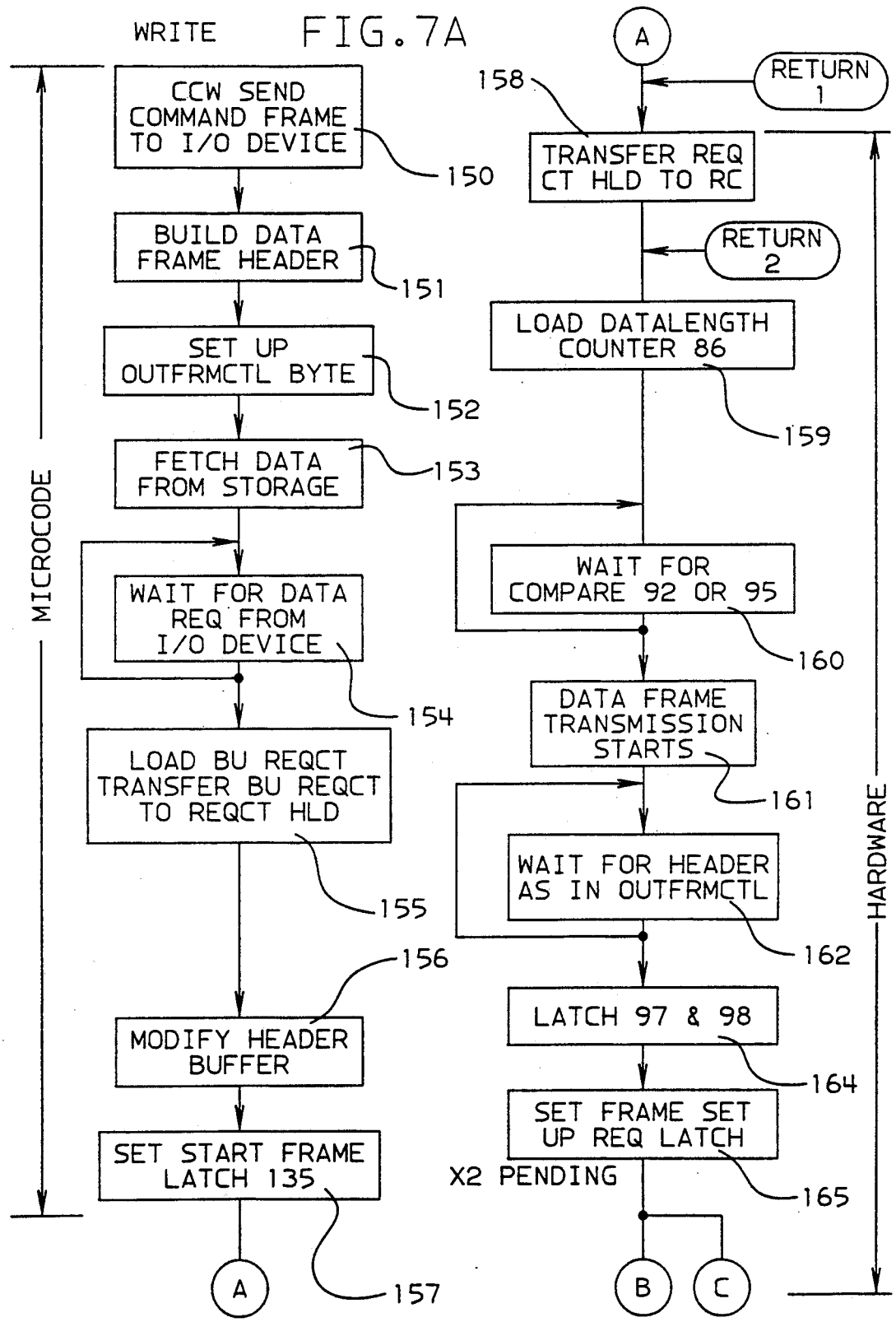
FIGS. 7A, 7B and 7C, joined at connectors A, B and C, form a flow chart showing the operations of the hardware and microcode of the invention during a write operation.
Figure 7B:
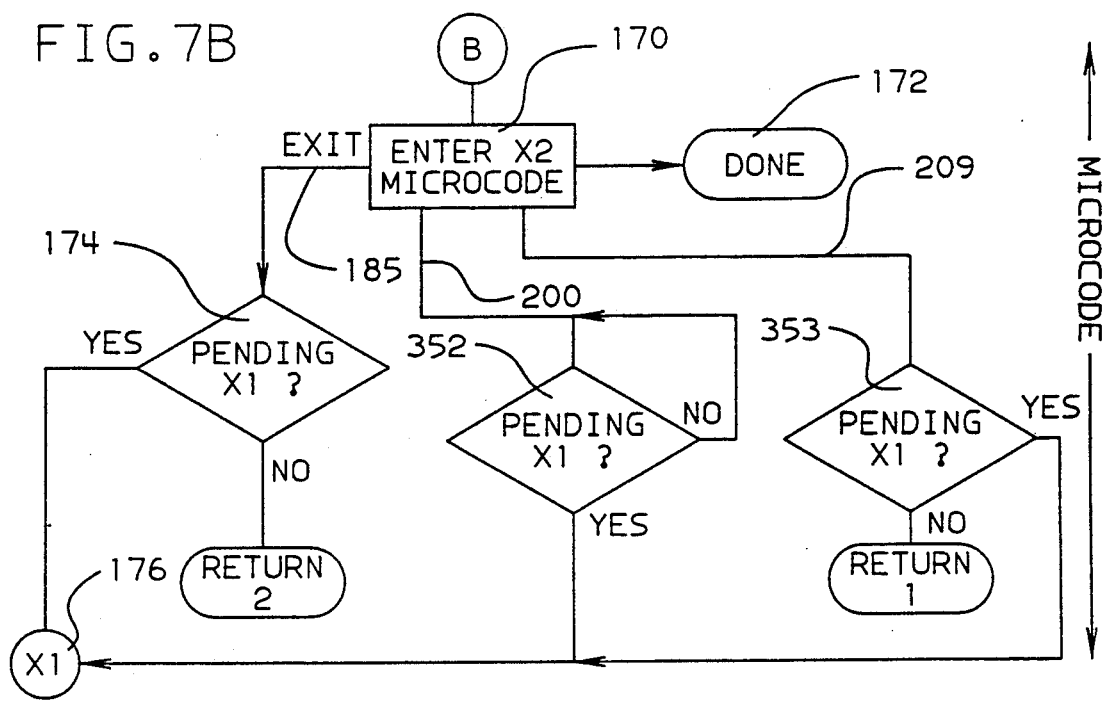
Figure 7C:
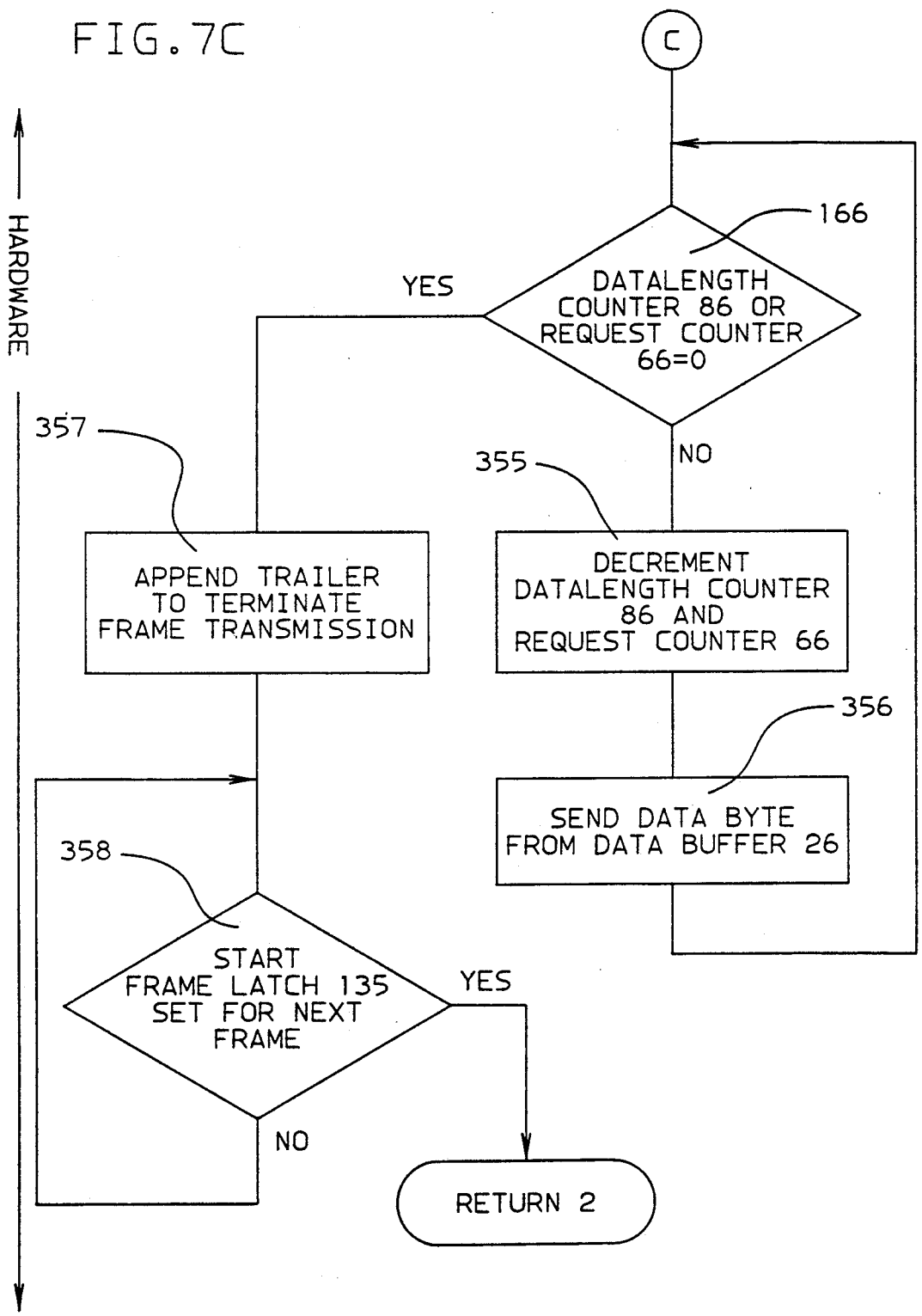

FIGS. 7A, 7B and 7C form a flow chart for a write operation and shows both microcode operations and hardware operations. At 150, a channel command word (CCW) causes a command frame to be sent to the I/O device telling the I/O device to be ready to receive data, as is well known in the art. At 151, the microcode routine of the channel processor 52 builds the data frame header. At 152, the channel processor sets up the outbound frame control byte in the outbound frame control register 132. At 153, the channel 14 fetches data from the memory of the computer 12 and stores it in the data buffer 26. At 154, the microcode of the channel processor 52 waits for a data request from the I/O device. Once a data request has been received at 154, the microcode goes to 155 wherein the request count received from the I/O device at 154 is loaded into the backup request count register 62. This value will immediately be transferred to the request count hold register 64. At 156, the channel processor modifies the header in the outbound frame header buffer 130 in response to any changes that might be necessary because of the data request received at 154. The outbound frame state machine 32 is then started at 157 to start transmission of a data frame to the I/O device. At this point, hardware operations will take over. At 158, the request count in request count hold register 64 will be transferred to the request counter 66. At 159, the data length counter 86 of FIG. 4B is loaded through the decoder 84 from the DIB register 82. At 160, the hardware waits for the comparitors 92 or 95 to give the results of their comparison. A true response from either comparitor 92 or comparitor 95 will start the data frame transmission at 161. At 162, the hardware waits for the completion of the header as specified in the outbound frame control 132. The completion of the header from the outbound frame state machine is known as end of header (EOH) time. At EOH, the outputs of the comparitors 93 and 94 are latched by latches 97 and 98, as shown at 164. At 165, the frame setup request latch 100 is set.

It will be understood that the microcode and the hardware may run in parallel. Microcode routine X1 is a routine to process a data request during a write operation and will be discussed further in connection with FIGS. 9A and 9B. Microcode routine X2 is a routine to transmit a data frame and will be discussed in connection with FIGS. 8A and 8B. The transmission of data bytes will continue until either the data length counter 86 goes to zero or the data request counter 66 goes to zero, as shown at 166 of FIG. 7C. If the check at 166 is no, the counters 86 and 66 are decremented by one at 355, and a data byte is sent from the data buffer 26 as part of the data frame 48, as shown at 356, and control is transferred back to the check at 166. If the check at 166 is yes, the trailer 55 is appended at 357, and a check is made at 358 to see if the start frame latch 135 is set for the transmission of the next frame. If the start frame latch 135 is set at 358, the routine returns to RETURN2 of FIG. 7A. If not, the check at 358 is repeated until the start frame latch 135 is set to start transmission of a new frame.

It will further be understood that microcode routine X1 and microcode routine X2 cannot be executed by the channel processor 52 at the same time. Microcode routine X2 becomes pending when the frame setup request latch 100 has been set. Microcode routine X1 becomes pending when a frame is received in the inbound frame header buffer 107 from an I/O device. Microcode routine X1 always has priority over the microcode routine X2. Thus, at 170 of FIG. 7B, the microcode routine X2 will be started unless the channel processor is executing microcode routine X1. In that case, the channel processor 52 will complete microcode routine X1 and then enter microcode routine X2. The microcode routine X2 has four exits. The first exit at 172 is taken when all of the data specified by the CCW count has been sent to the I/O device and the data transfer for this CCW is done. The second exit at 185 is taken when the current data request is not complete. The third exit at 209 will be taken when the previous data request is complete, and a new data request has been started. The fourth exit at 200 will be taken when the previous data request is complete, but a new data request has not been received from the I/O device. Each exit 185, 200 and 209 has a check 174, 352 and 353, respectively, to see if the routine X1 is pending. If X1 is pending in each case, the X1 routine is executed at 176. If X1 is not pending at 174, the routine goes to return 2 of FIG. 7A. If X1 is not pending at 352, the routine waits until X1 is pending. If X1 is not pending at 353, the routine goes to return 1 of FIG. 7A. Again, it will be understood that the X1 microcode routine may be executed at any time during a write data transfer operation to handle data requests coming from the I/O device. It is further understood that microcode routine X1, as well as other microcode routines to fetch data from and communicate with computer system 12 (not described) can be executed concurrently with the actions labeled 'HARDWARE' in FIGS. 7A-7C.

Figure 8A:
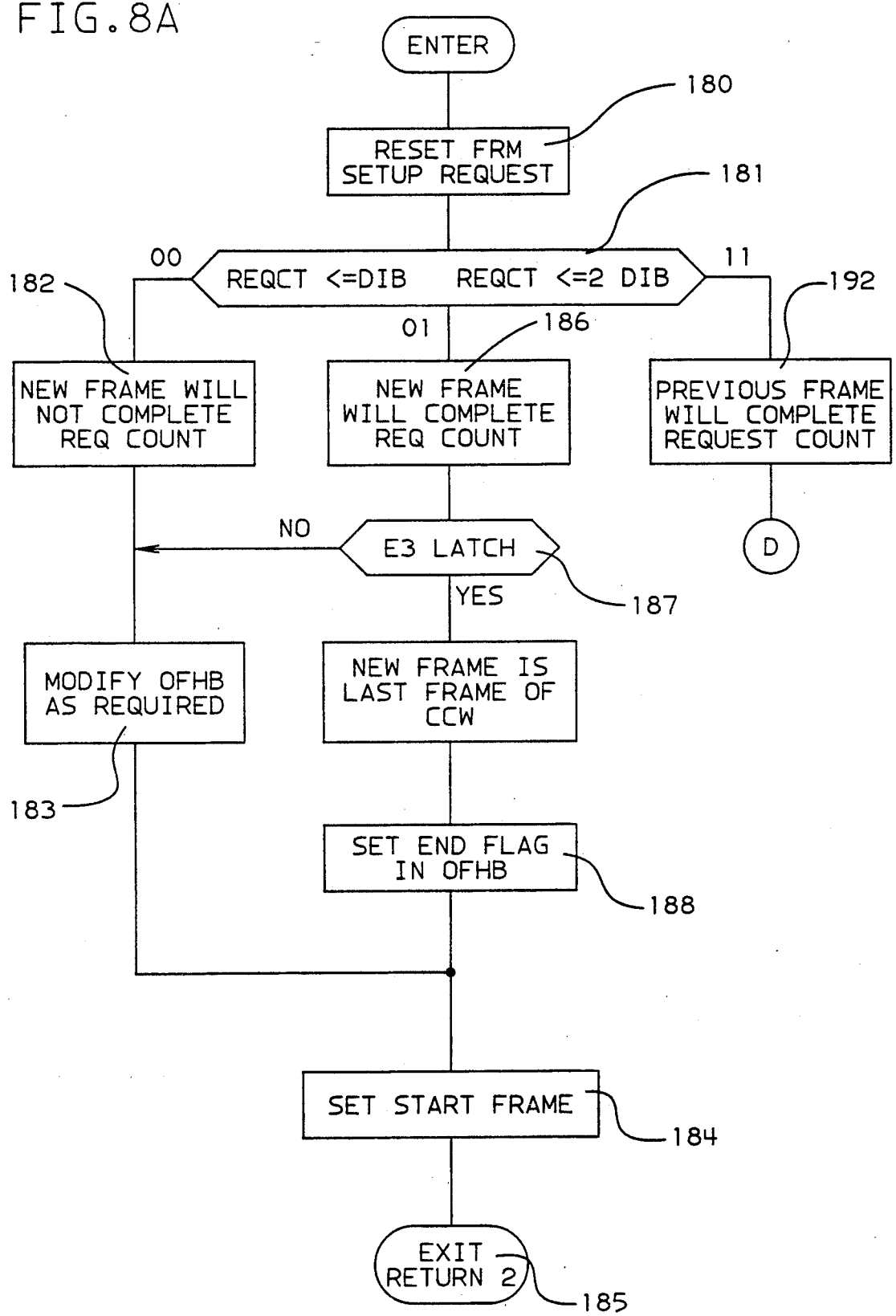
FIGS. 8A and 8B, joined at connector D form a flow chart of the microcode for transmitting a data frame during a write operation.
Figure 8B:
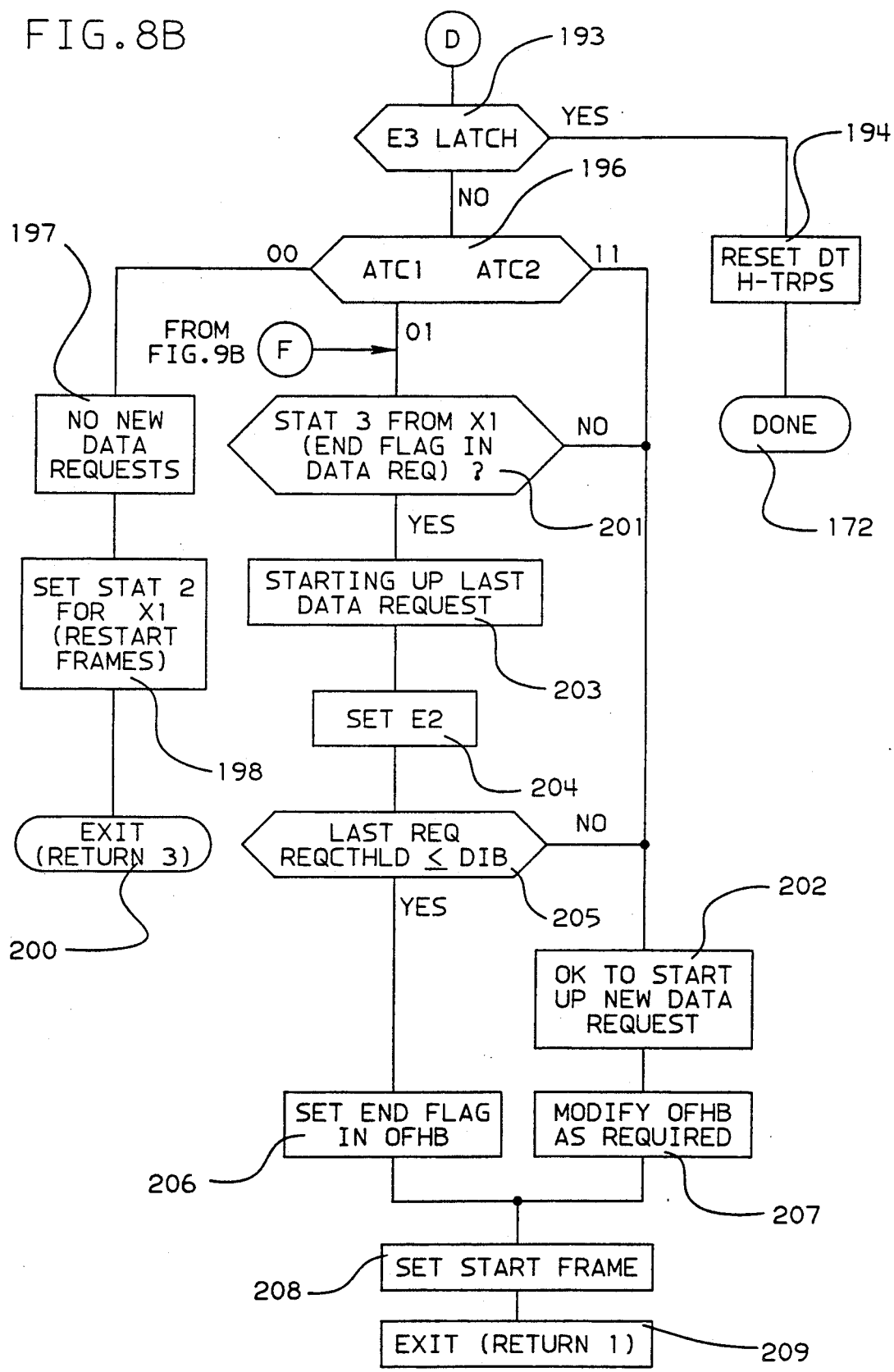

FIGS. 8A and 8B form a flow chart of the X2 microcode routine for transmitting a data frame. At 180, the frame setup request latch 100 is reset to indicate that the X2 routine is no longer pending. At 181, the results of the comparisons at 93 and 94 at EOH is tested. If neither comparison is true, the new frame will not complete the request count, as shown at 182. If this branch is taken, the outbound frame header buffer 130 is modified as required at 183, the start frame latch 135 is set at 184, and the X2 microroutine is exited at 185.

At 186, if REQCT<=2 DIB as shown in latch 97, a new frame will complete the request count. If this branch is taken, a check is made at 187 to see if the E3 latch is set. If the E3 latch is not set, the routine goes to 183 wherein the outbound frame header buffer is modified and the routine completes branch 182, as previously described. If the E3 latch is set, a new frame will be the last frame of this CCW. In this case, an end flag in the header being built in the outbound frame header buffer is set at 188, and the routine goes to 184.

If both of the compares 93 and 94 are true, the previous frame will complete the request count as shown at 192. If this branch is taken, a check is made at 193 of FIG. 8B to see if the E3 latch is set. If the E3 latch is set, the DT-H-TRPS latch 101 is disabled at 194, and the X2 microcode is exited at done 172. If the E3 latch is not set at 193, a comparison is made of the ATC1 and ATC2 latches at 196. If neither ATC1 nor ATC2 are true, there are no new data requests and the microcode must wait as shown at 197. If this branch is taken, a STAT2 indicator is set at 198, and the X2 microcode routine exits at 200. If the ATC2 latch is set, a check is made at 201 to see if a STAT3 indicator has been set, as will be discussed in connection with FIG. 9A. If STAT3 has not been set, it is okay to start a new data request as shown at 202. The outbound frame header buffer is modified as required at 207, the start frame latch is set at 208, and exit 209 is taken. If STAT3 has been set, it indicates that the last data request is being started, as shown at 203. If this branch is taken, the E2 latch is set at 204, a check is made at 205 to see if REQCTH-LD<=DIB, as shown by comparitor 96. If the check at 205 is no, it is okay to start up a new data request as shown at 202, as discussed above. If the check at 205 is yes, the end flag is set in the outframe header buffer at 206, and control is passed to 208, as discussed above.

Figure 9A:
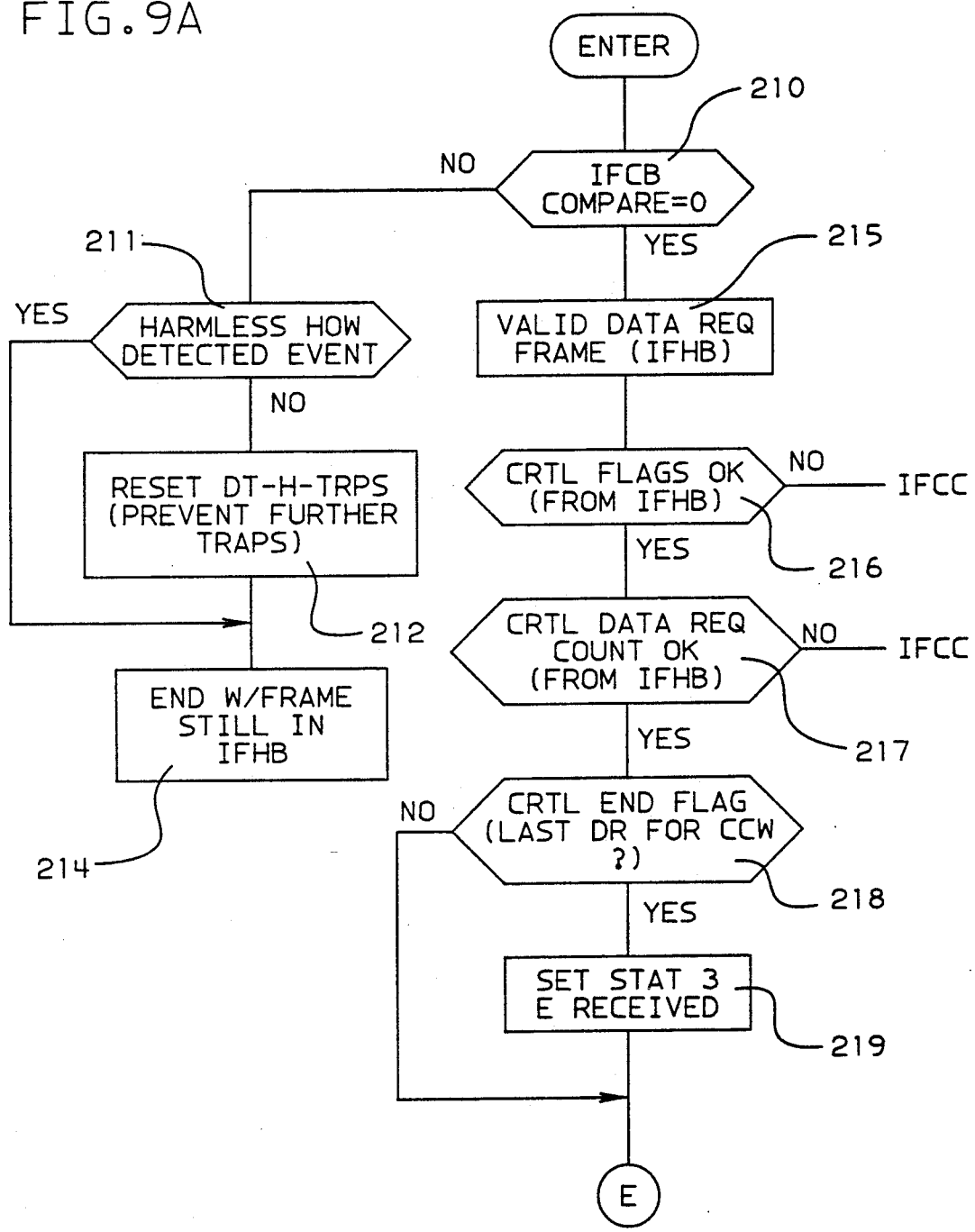
FIGS. 9A and 9B, joined at connector E, form a flow chart of the microcode for processing a data request during a write operation.
Figure 9B:
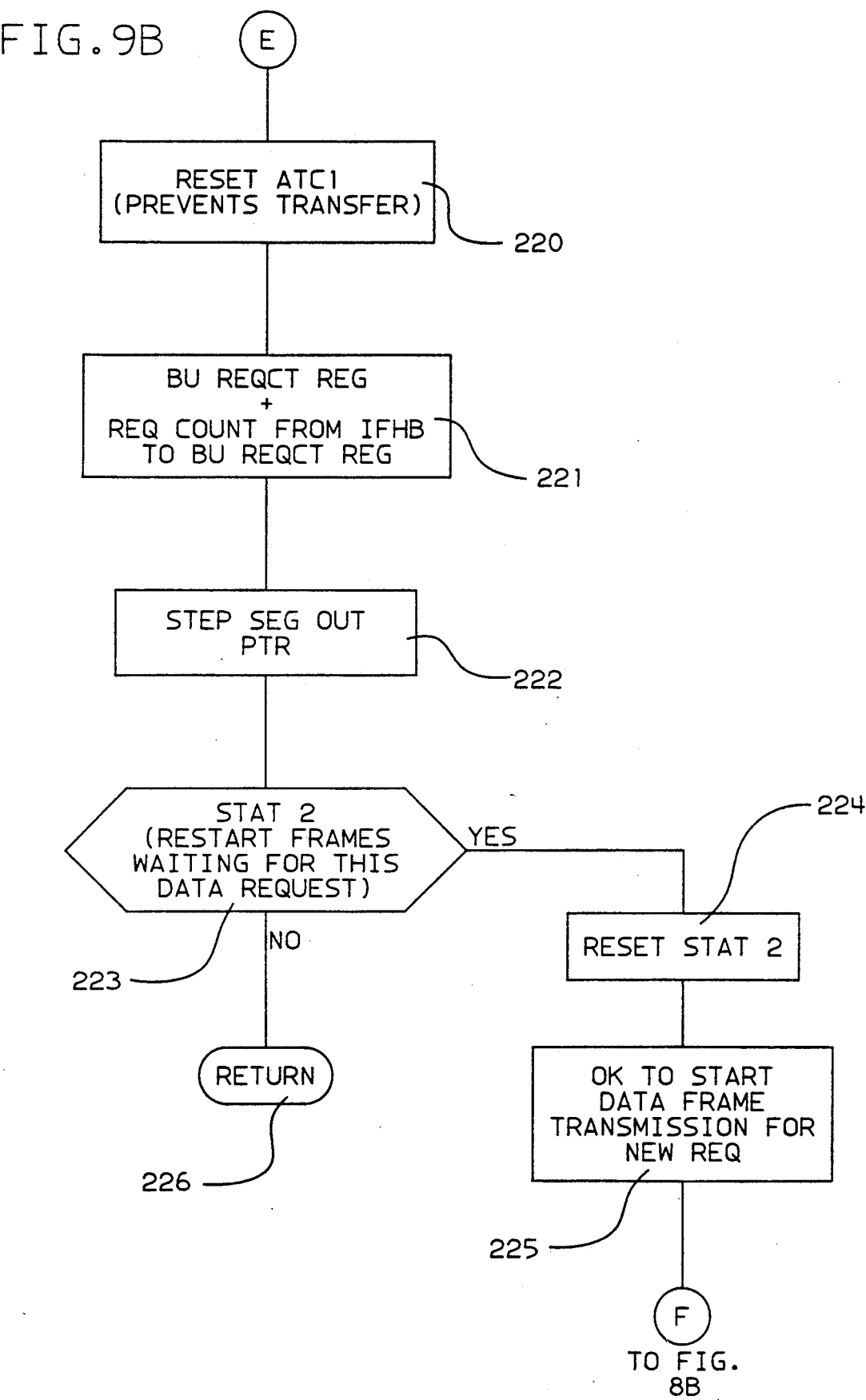

FIGS. 9A and 9B form a flow chart of the microprocessor routine X1 wherein a data request is processed. At 210, the contents of the inbound frame compare buffer 120 is checked to see if the received frame compares with the expected frame stored in the inbound frame expect mask buffer 110, as previously discussed. If the check at 210 is no, a check is made at 211 to see if the miscompares detected were harmless hardware events wherein the frame content is not affected. If the events detected were not harmless hardware events, the DT-H-TRPS latch 101 is disabled to prevent further data transfer traps, and the X1 routine ends at 214 with the frame still in the inbound frame header buffer 107. If the detected events are harmless hardware events, 212 is bypassed, and the X1 routine ends at 214. If the compare at 210 is equal, there is a valid data request frame in the inbound frame header buffer as shown at 215. If no flags in the control block 57 of the header are in error as checked at 216, the data request count in the control block 57 is checked for a valid value at 217. If errors were located in either of the checks 216 or 217, an inbound frame control check is raised. If both of the checks at 216 and 217 are passed, a check is made at 218 to determine if an end flag is present in the control block of the header. If an end flag is detected at 218, a STAT3 indication is set at 219. If an end flag is not detected at 218, 219 is bypassed. At 220 of FIG. 9B, the ATC1 register 70 is reset. At 221, the value in the backup request count register 62 is added to the new request count from the control block 57 of the data request frame, and the result is returned to the backup request count register 62. At 222, the segment out pointer 116 is incremented to move to the next header in the inbound frame header buffer 107. At 223, the STAT2 indicator is tested. If STAT2 is set at 223, STAT2 is reset at 224 which indicates that it is all right to start data frame transmission for the new request, as shown at 225. After 225, the microcode routine transfers control to the test 201 of FIG. 8B in the X2 microcode routine for starting the data frame transmission. If the test at 223 is no, the routine returns at 226.

Figure 10:
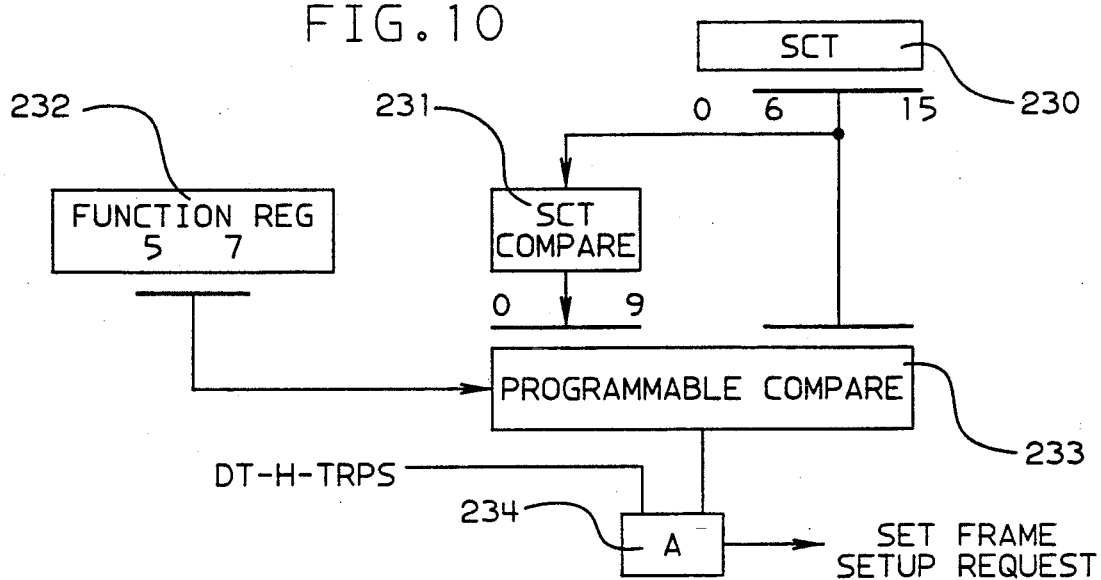
FIG. 10 is a block diagram of another portion of the transfer control circuit of FIG. 2 used for read operations.

FIG. 10 is a portion of the transfer control circuit 50 of FIG. 2, and is used for read operations. The circuit of FIG. 10 includes a storage counter (SCT) 230 which is loaded with a value which represents the number of data bytes to be transferred by a CCW. The initial value in the storage counter 230 is also loaded in a storage count compare (SCT COMPARE) register 231. The number in the storage count compare register 231 is loaded only once, while the number in the storage counter 230 is decremented with each data byte that is transferred between the computer 12 and the data buffer 26. A function register 232 is loaded with a count for use by a programmable compare 233 for determining how much room must be available in the data buffer 26 before a new data request can be made. The number in function register 232 is used to compute the number of least significant bits in storage count compare register 231 is to be compared with the same number of least significant bits in storage counter 230. It will be understood that if the four least significant bits in the registers 230 and 231 are compared, the programmable compare 233 will have an equal compare every 16 counts of the storage counter 230. If the five least significant bits are miscompared, an equal compare will result every 32 counts of the storage counter 230, and so forth. AND gate 234 has a first input connected to the output of the programmable compare 233, and a second input connected to the DT-H-TRPS latch 101. The output of the AND gate 234 sets the frame setup request latch 100 of FIG. 4B when both the DT-H-TRPS latch 101 is enabled and the output of the programmable compare 233 indicates an equal compare.

Figure 11C:
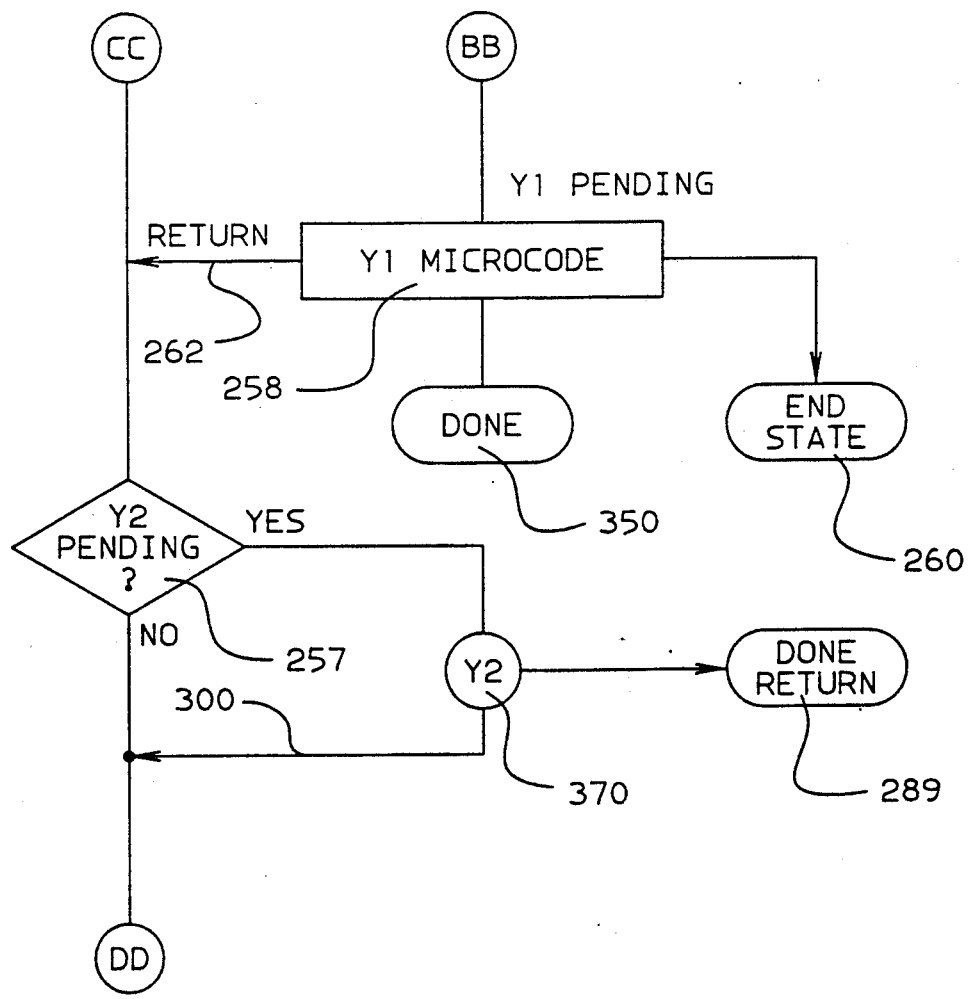
Figure 11B:
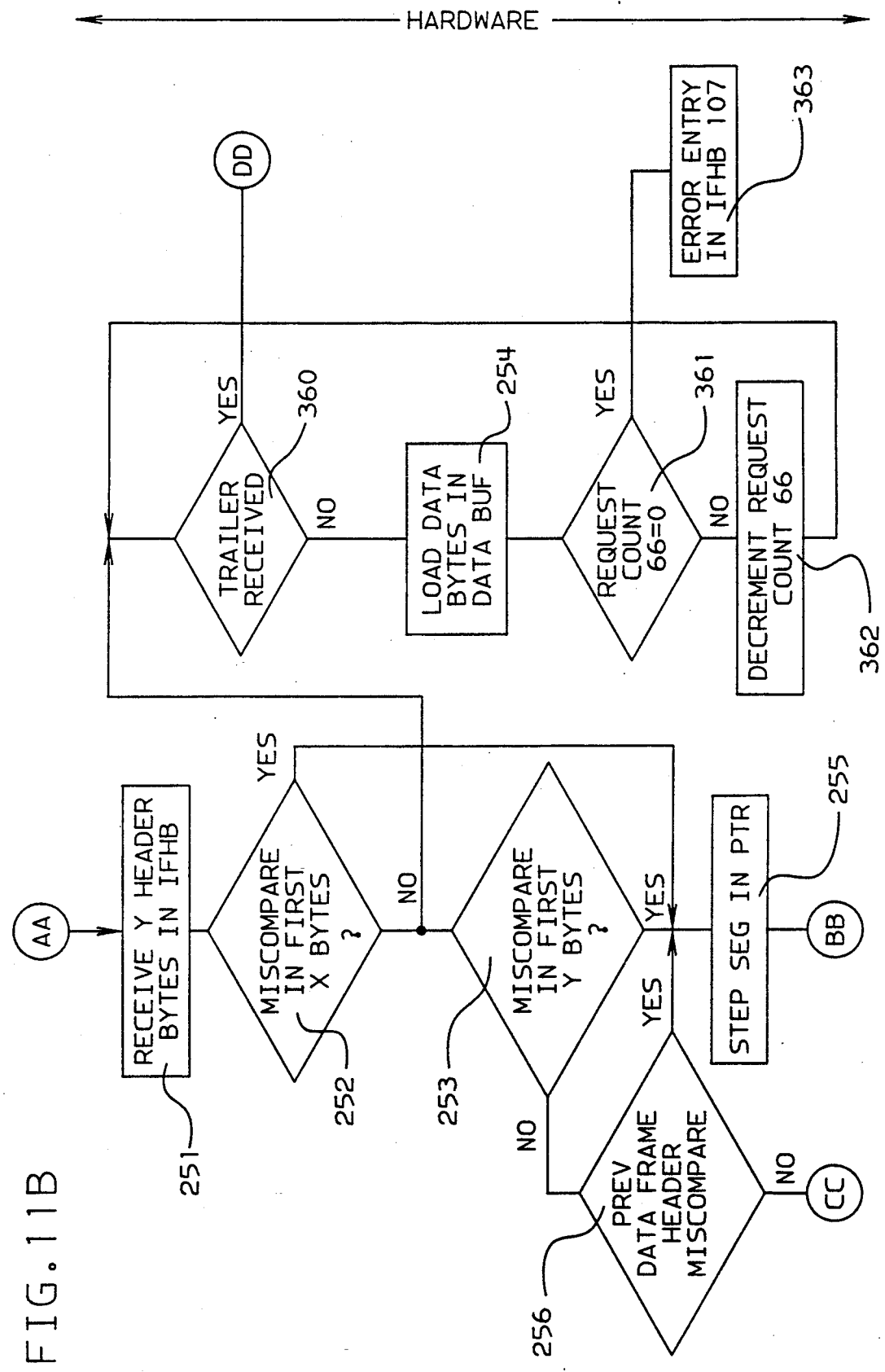

FIGS. 11A, 11B and 11C form a flow chart showing the operation of the microcode and the hardware during a read operation. At 240, a CCW is issued for a read operation, as is well known in the art. At 241, the contents of the in frame expect mask buffer 110 and the in frame control register 122 is setup by the channel processor 52. At 242, the microcode makes a comparison to see if the CCW count is greater than the data buffer size. If it is, the data buffer size is loaded into the backup request count register 62 at 243. If not, the E1 latch 74 is set and the CCW count for this CCW is loaded into the backup request count register 62 at 244. At 245, the channel processor 52 loads the CCW count value into the storage counter 230 of FIG. 10. The value in the storage counter 230 is then transferred into the storage count compare register 231 to be used by the programmable compare 233 as previously described. At 246, a command frame with the value in the backup request count register 62 is sent to the I/O device to instruct the I/O device on how much data is to be sent to the channel. At 247, the channel processor 52 builds a data request frame header in the outbound frame header buffer 130. At 248, a value is set in the function register 232 to be used by the programmable compare 233 to determine the threshold for additional data requests needed to satisfy the CCW count, as previously described. At 249, the DT-H-TRPS latch 101 is set. At 250, the hardware waits for a data frame to be received by the inbound header buffer 107.

At 251 of FIG. 11B, the number of bytes specified by the Y count of the inbound frame control register 122 of FIG. 5 are loaded into the current segment of the inbound frame header buffer 107. At 252, a check is made to determine if a miscompare occurred within the first X bytes of the header, as specified by the inbound frame control register 122. If no miscompare occurred at 252, the receipt of the trailer 55 is checked for at 360. If the trailer is received at 360, control is transferred to 250 of FIG. 11A. If the trailer 55 is not received at 360, the remaining data bytes of the frame are loaded over data bus 28 of FIG. 2 into data buffer 26 at 254. As each data byte is received, a check is made at 361 to insure that the request counter 66 is not equal to zero. If the request counter is not zero, it is decremented at 362 and control is transferred back to 360. If the request counter is zero, an error entry is made into the inbound frame header buffer 107 at 363.

If any of the first X bytes miscompare, the remaining bytes in the frame will continue to be written into the inbound frame header buffer 107.

Also, in parallel, a check is made at 253 to determine if a miscompare occurred within the first Y bytes. If a miscompare is detected either at 252 or 253, the SEG IN PTR 114 is stepped at 255 such that its contents will be unequal to the SEG OUT PTR 116.

At this point, the Y1 microcode routine, to be discussed in connection with FIGS. 12A-12B, becomes pending. If the check at 253 is no, a check is made at 256 to see if the previous data frame caused a header miscompare. If it did, control is transferred to 255 wherein the SET IN PTR 114 is stepped, as previously discussed. From 255, the Y1 microcode routine is executed at 258 of FIG. 11C. If the check at 256 is no, a check is made at 257 of FIG. 11C to see if the Y2 microcode routine is pending. The Y1 microcode routine at 258 has three exits. The first exit 262 is a return which goes to check 257 to see if the Y2 microcode routine is pending. The second exit goes to an end state exit at 260 which indicates that the I/O device has terminated the data transfer. The third exit goes to 350 which indicates that all of the data specified by the CCW count has been sent by the I/O device. If a Y2 microcode routine is pending, as checked at 257, the Y2 microcode routine is executed at 370. If a Y2 microcode routine is presently not pending, control is transferred by the microcode routine back to hardware at 250 of FIG. 11A which waits for the next data frame, as discussed.

It will be understood that the Y2 microcode routine becomes pending whenever the frame setup request latch 100 is set. This may occur at any time in the read operation. The Y1 microcode routine becomes pending whenever there is a header miscompare, either in the present header or the previous header in the inbound frame header buffer 107. Routine Y1 always has priority over routine Y2. It is further understood that microcode routines Y1 or Y2, as well as other microcode routines (not described) which store data to and communicate with computer system 12, may be executed concurrently with the actions labeled as 'HARDWARE' in FIGS. 11A and 11B.

Figure 12B:
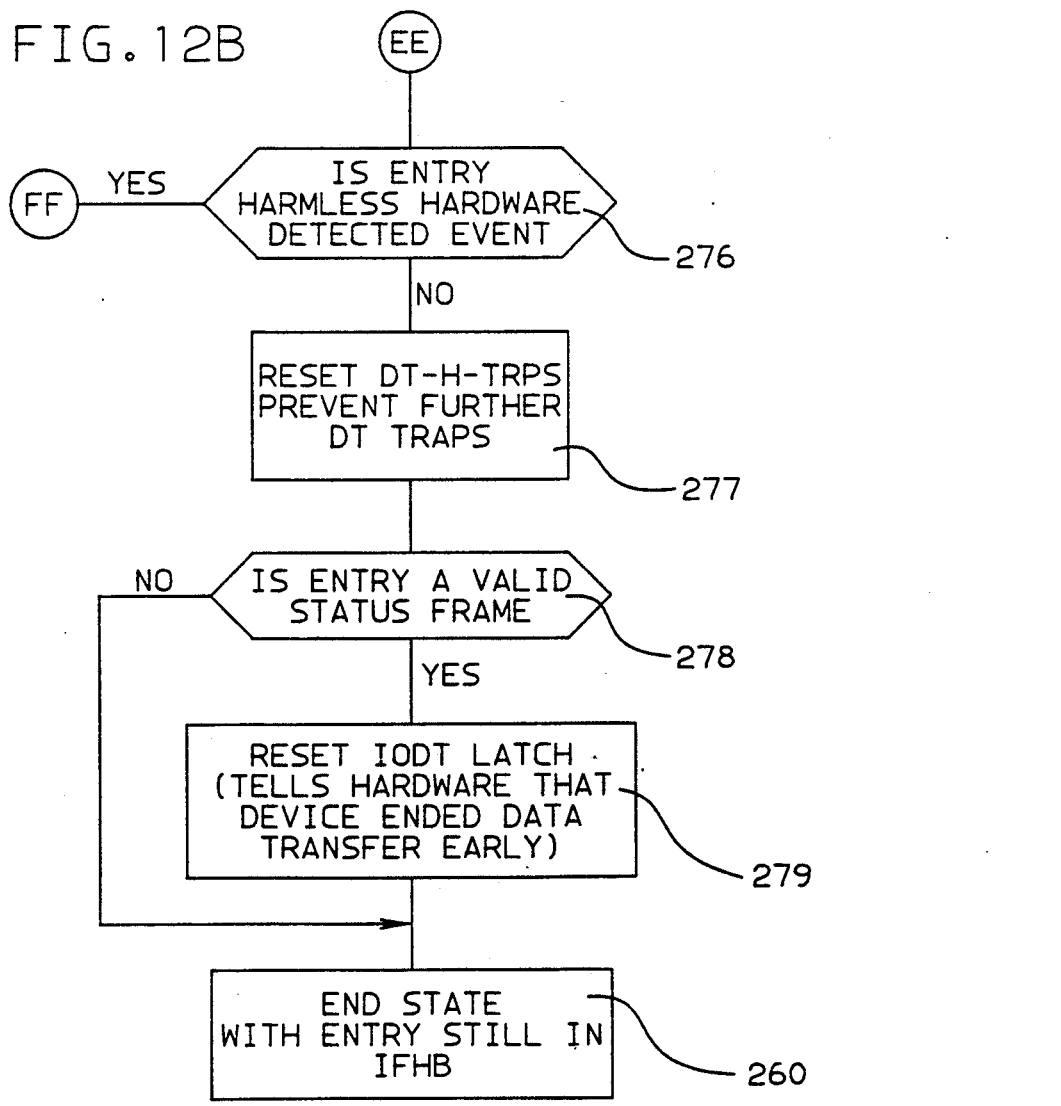
FIGS. 12A and 12B, joined at connectors EE and FF, form a flow chart of the microcode for processing a data frame header during a read operation.
Figure 12A:
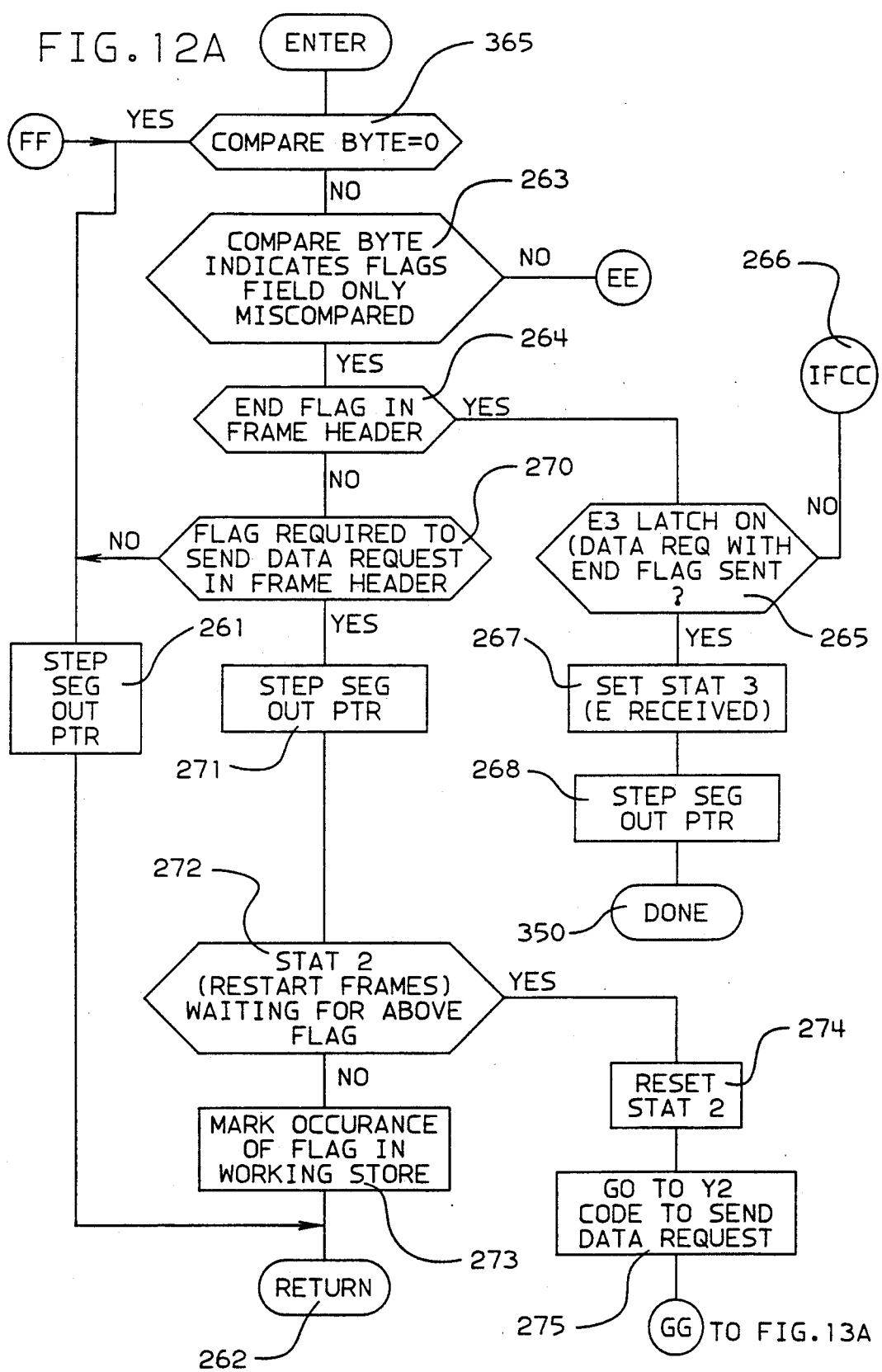

FIGS. 12A and 12B form a flowchart for the Y1 microcode routine which processes a data frame header during a read operation. At 365, the contents of the inbound frame compare buffer 120 is checked to see if the compare byte is equal to zero. If it is, the SEG OUT PTR 116 is stepped at 261 and the microcode returns at 262. If the check at 365 is no, a check is made at 263 to see if only the flag fields of the control block 57 of a data frame miscompare. If yes, a check is made at 264 to see if the end flag was set. If the check at 264 is yes, a check is made at 265 to see if the E3 latch 78 is on. If the E3 latch is not set at 265, an inbound frame control check is raised at 266 to indicate an error. If the E3 latch 78 is set at 265, the STAT3 indicator is set at 267. The SEG OUT PTR 116 is then stepped at 268 and the done exit 350 previously discussed is taken. If the end flag is not set at check 264, a check is made at 270 to determine if a flag required to send a data request is present in the frame header. If not, the SEG OUT PTR 116 is stepped at 261 and the return at 262 is taken. If a flag is present at 270, the SEG OUT PTR 116 is stepped at 271. A check is then made at 272 to determine if the STAT2 condition is set. If the STAT2 condition is not set at 272, a mark of which flag occurred is made in working storage of the channel processor 52 at 273, and the return at 262 is taken. If the STAT2 condition is set at 272, the STAT2 condition is reset at 274 and a transfer is made at 275 to send a data request by means of the Y2 microcode routine, to be discussed in connection with FIGS. 13A–13C.

If the check at 263 is no, a check is made at 276 of FIG. 12B to determine if the miscompare was caused by a harmless hardware detected event which does not affect the content of the data frame. If the check at 276 is yes, that is, a harmless hardware event was detected, the routine steps the SET OUT PTR 116 at 261, as previously discussed in connection with FIG. 12A. If the check at 276 is no, the DT-H-TRPS latch 101 is disabled at 277 to prevent further data transfer traps from being taken. A check is made at 278 to determine if the entry in the inbound frame header buffer 107 is a valid status frame. If the check at 278 is no, the routine exits at end state 260 with the entry still in the inframe header buffer 107. If the check at 278 is yes, the input-/output data transfer latch 102 of FIG. 4B is reset at 279. When the input/output data transfer latch 102 is on, a data frame is allowed to be recognized by the hardware. If the input/output data transfer latch 102 is off, it tells the hardware that all of the data has been transferred for this CCW, and any data still remaining in data buffer 26 should be transferred to main storage in the computer system 12.

Figure 13A:
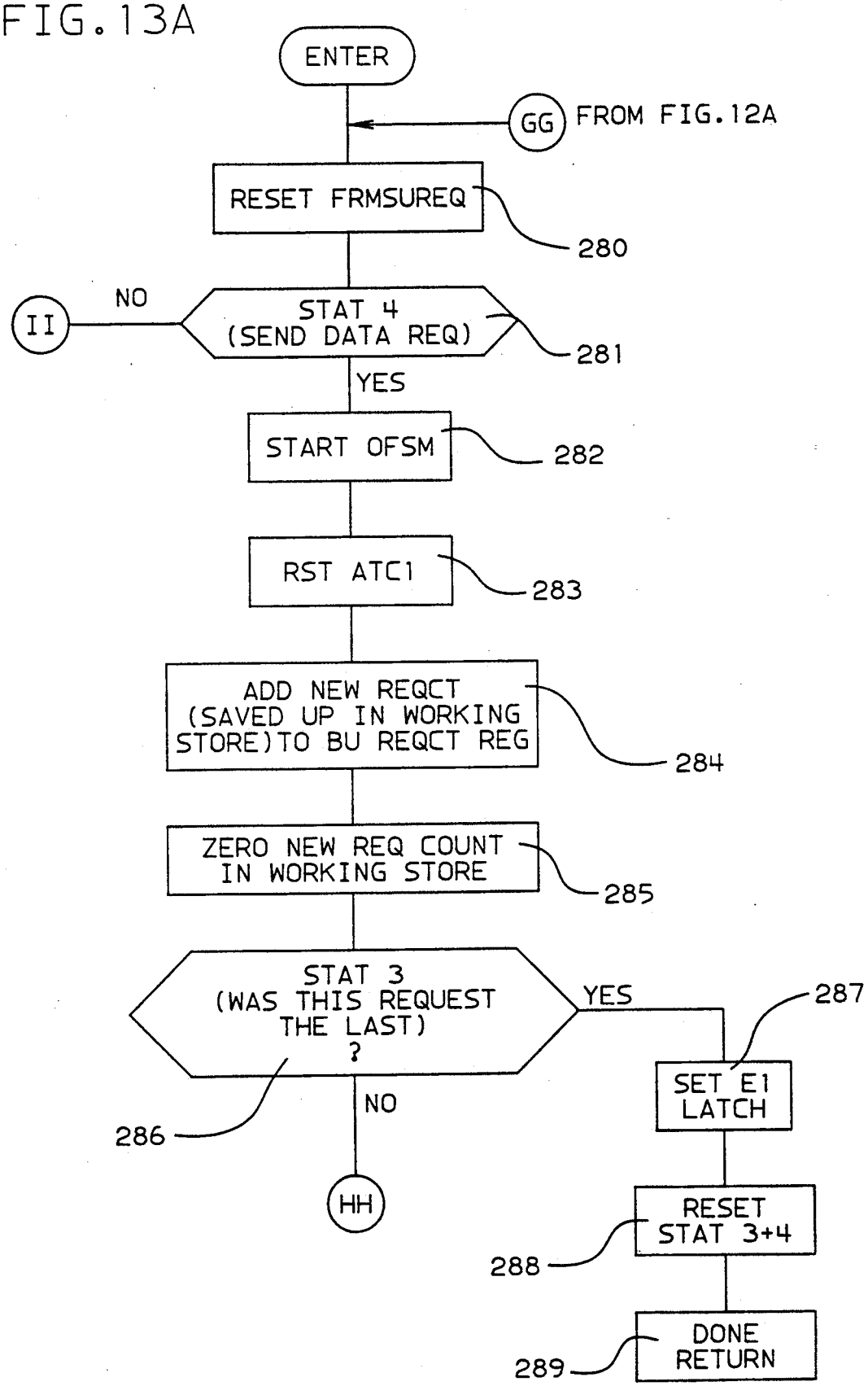
FIGS. 13A, 13B and 13C, joined at connectors HH, II and JJ, form a flow chart of the microcode for sending a data request during a read operation.
Figure 13B:
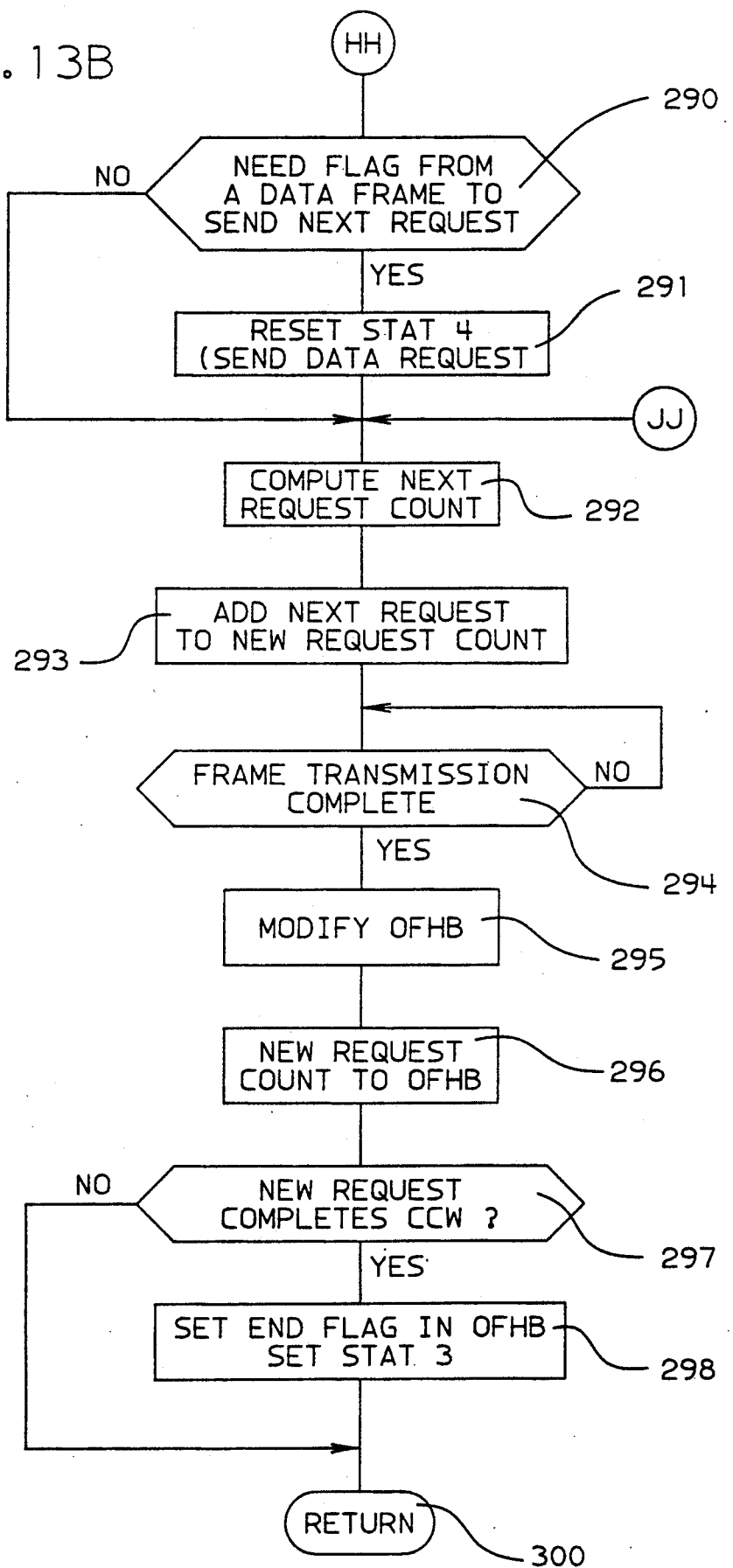
Figure 13C:
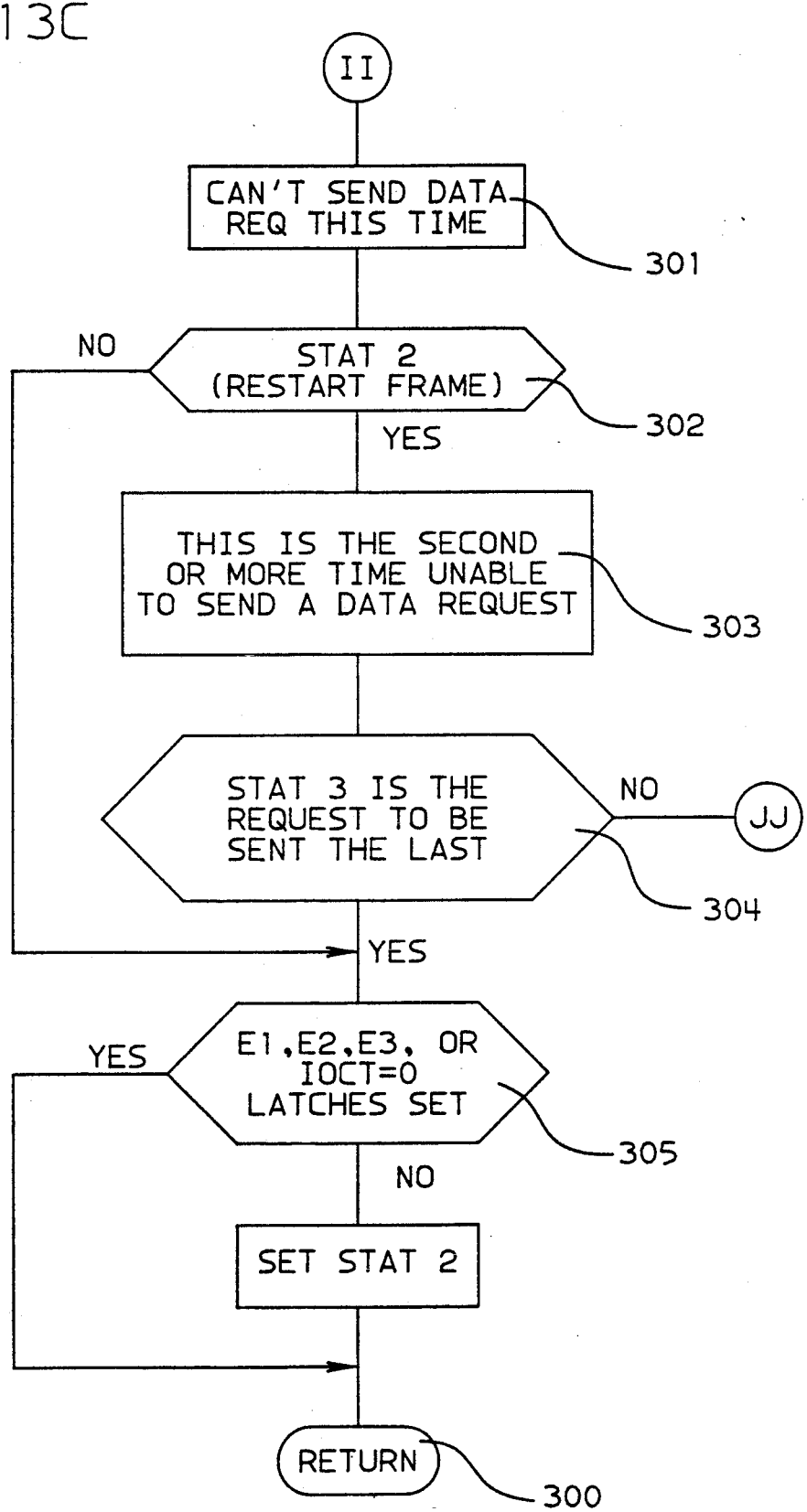

FIGS. 13A, 13B and 13C form a flowchart of the Y2 microcode routine which sends a data request in a read operation. This routine is invoked when Y2 becomes pending, previously discussed, or from the Y1 microcode routine if STAT2 is set at 272, also previously discussed. AT 280, the frame setup request latch 100 is reset. At 281, the STAT4 indicator is checked. If the STAT4 is set, the outbound frame state machine is started at 282 to send the data request built in the outbound frame header buffer 130. The ATC1 latch 70 is reset at 283 and the new value of the request count is added to that value saved in the backup request count register 62, as shown at 284. The new value of the request count is then zeroed in processor working storage at 285, and a check is made at 286 to see if the STAT3 indicator is set. If STAT3 is set at 286, the E1 latch 74 is set at 287, STAT3 and STAT4 are reset at 288 and the Y2 read routine exits at done return 289. If STAT3 is not set at 286, a check is made at 290 of FIG. 13B to determine if a flag is needed from a data frame to send the next request. If a flag is needed at 290, STAT4 is reset at 291. If a flag is not needed at 290, the reset at 291 is bypassed. At 292, the channel processor 52 computes the next request count. At 293, the channel processor 52 adds the next request count computed at 292 to the new request count in its working storage. At 294, a check is made to see if the frame transmission is complete. At 295, the channel processor 52 modifies the header and the outbound frame header buffer 130, as desired. At 296, the computed new request count is placed in the frame in the outbound frame header buffer 130. At 297, the channel processor 52 checks to see if the new request completes the CCW. If this new request will complete the CCW, the end flag in the outbound frame header buffer 130 is set, and the STAT3 indicator is set, as shown at 298. If the new request will not complete the CCW, 298 is bypassed. The microcode routine then exits to return at 300.

If the check at 281 of FIG. 13A indicates that STAT4 is not set, the routine transfers to 301 of FIG. 13C which indicates that a data request cannot be sent at this time. At 302, a check is made to see if STAT2 is set to restart frames. If STAT2 is set at 302, it indicates that this is the second or more times that the routine was unable to send a data request as shown at 303. At 304, STAT3 is checked to determine if this is the last data request to be sent. If the check at 304 is no, the microcode routine transfers to 292, as discussed. If the check at 302 is no or the check at 304 is yes, a check is made at 305 to see if any one of the E1, E2, E3 or IOCT=0 latches 74, 76, 78 and 80, respectively, has been set. If the check at 305 is no, the STAT2 indicator is set and the microcode routine returns at 300. If the check at 305 is yes, the routine exits at return 300.

The inbound frame state machine 24 of FIG. 2 is more fully described in U.S. Pat. Application Ser. No. 07/429,257 to Casper et al for Apparatus For Decoding Frames From a Data Link, filed Oct. 30, 1989, owned by the Assignee of the present invention, and incorporated herein by reference. The outbound frame state machine 32 of FIG. 2 is more fully described in U.S. Pat. Application Ser. No. 07/428,798 to Casper et al for Apparatus For Constructing Data Frames For Transmission Over a Data Link, filed Oct. 30, 1989, owned by the Assignee of the present invention, and incorporated herein by reference.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. In a channel of a data processing system, a transfer apparatus for transferring data frames between the data processing system and an I/O device wherein said data processing system sends outbound data frames to said I/O device and said I/O device sends inbound data frames to said data processing system, said transfer apparatus comprising:

receiving means for receiving an inbound data frame from said I/O device, said receiving means having inbound frame header buffer means for receiving a header from said inbound data frame;

sending means for sending an outbound data frame to said I/O device, said sending means having an outbound frame header buffer means for building a header for said outbound data frame;

data buffer means connected to said receiving means and said sending means for storing data transmitted between said data processing system and said I/O device;

data transfer control means connected to said receiving means and said sending means for controlling the number of data bytes to be transferred between said data buffer means and said I/O device;

request count means in said data transfer control means for storing a request count value representing the number of data bytes to be transferred to or from said I/O device;

microcode routine controlled microprocessor means connected to said receiving means, said sending means and said request count means for analyzing said inbound frame headers in said inbound frame header buffer means, building frame headers in said outbound frame header buffer means, initiating the transmission of outbound data frames, loading said request count into said request count means, and controlling said data transfer control means for transferring data frames until the number of data bytes indicated by said request count value stored in said request count means have been transferred;

a backup request count register in said request count means connected to said microprocessor means, said backup request count register being loadable with said request count value from said microprocessor means;

a request counter in said data transfer control means connected to said backup request count register, said request counter for receiving said request count value from said backup request count register and being decremented by one for each data byte that is transferred to or from said I/O device; and a valid latch in said data transfer control means associated with said backup request count register and connected to said microprocessor for indicating when the value contained in said backup request count register is valid.

2. The apparatus of claim 1 wherein said microcode routine includes means for updating the contents of said backup request count register.

3. The apparatus of claim 1 wherein said valid latch is resettable by said microcode routine for preventing the value in said backup request count register from being transferred therefrom when the contents of said backup request counter register is not valid.

4. The apparatus of claim 3 wherein said data transfer control means further comprises a request count hold register having an input connected to and being loadable by said backup request count register and an output connected to said request counter, said request count hold register for holding request count values loaded therein from said backup request count register and loading said request count values loaded therein into said request counter.

5. The apparatus of claim 4 wherein said backup request count register is set to zero when the request count value therein is loaded into said request count hold register such that said microprocessor means always adds said request count value into the value in said backup request count register.

6. The apparatus of claim 4 wherein said data transfer control means further comprises a second valid latch associated with said request count hold register and connected to said microprocessor for indicating when the contents of said request count hold register is valid.

7. The apparatus of claim 6 wherein said microde routine interrogates said valid latches and includes means for determining if a new data request has been received during a write operation.

8. The apparatus of claim 4 wherein said backup request count register, said request count hold register and said request counter may hold an end request value, and said data transfer control means further comprises E1, E2 and E3 latches associated with said backup request count register, said request count hold register and said request counter, respectively, and each is connected to said microprocessor, each for indicating to said microcode routine the location of said end request value in said backup request count register, said request count hold register or said request counter, respectively.

9. The apparatus of claim 8 wherein said data transfer control means includes an IOCT=0 latch having an input connected to said E3 latch, an input connected to said request counter, and an output connected to said microprocessor, said IOCT=0 latch for indicating to said microcode routine when the contents of the request counter is zero, indicating when the requested data byte count for said end request value has been completed.

10. The apparatus of claim 9 wherein said data transfer control means includes a storage counter connected to said microprocessor to be loaded with a value which represents the number of data bytes to be transferred in an operation, said storage counter decremented in response to each byte transferred from said data processing system to said transfer apparatus, a function register connected to said microprocessor to be loaded with a value which represents how much room must be available in said data buffer, and programmable compare means having a first input connected to said storage counter, a second input connected to said function register and an output, said programmable compare means for comparing the values in said storage counter and said function register and giving a signal on its output indicating when there is sufficient space available in said data buffer means to accept a new data request.

11. The apparatus of claim 10 wherein said microcode routine includes a read routine to perform a read operation, said read routine including a new data request routine, and wherein said data transfer control means further includes a FRMSUREQ latch means connected to the output of said programmable compare means and settable by the signal on the output of said programmable compare means during read operations and, which when set, starts said new data request routine.

12. The apparatus of claim 11 wherein said microcode routine includes a write routine to perform a write operation, said write operation including a transmit data frame routine, and said FRMSUREQ latch means is further settable during said write operation when the transmission of an outbound frame header is complete and, which when set, starts said transmit data frame routine.

13. The apparatus of claim 12 wherein said data transfer control means further comprises a transfer counter connected to said microprocessor, said transfer counter being incremented in response to each data byte transferred by said transfer apparatus, said transfer counter being interrogated by said microprocessor for verifying the number of data bytes transferred.

14. The apparatus of claim 1 wherein said data transfer control means includes comparison means having a first input connected to said microprocessor for receiving a DIB value representing the number of bytes transferable in a data frame, a second input connected to said request counter, and an output connected to said microprocessor, said comparison means for comparing said DIB value with the request count value in said request counter for providing to said microcode routine an indication of which data frame transmission will complete a requested data transfer.

15. The apparatus of claim 14 wherein said microcode routine contains branch means for interrogating said comparison means for determining when the number of data bytes transferred by said transfer apparatus will equal said request count value.

16. The apparatus of claim 15 wherein said comparison means includes a first comparitor having a first input connected to the first input of said comparison means, a second input connected to the second input of said comparison means and an output connected to said microprocessor for indicating at said branch means when the request count value is less than or equal to two times the DIB value, and a second comparitor having a first input connected to the first input of said comparison means, a second input connected to the second input of said comparison means and an output connected to said microprocessor for indicating at said branch means when said request count value is less than or equal to the DIB value.

17. The apparatus of claim 16 wherein said comparison means includes a third comparitor having a first input connected to the first input of said comparison means, a second input connected to the second input of said comparison means and an output connected to said microprocessor for indicating to said microcode routine when the data request will be satisfied by the data bytes transferred by a single frame only.

18. The apparatus of claim 17 wherein said third comparitor output has a first, true, value when the DIB value is greater than or equal to the request count value in said request counter and a second, false, value when the DIB value is not greater than or equal to the request count value in said request counter.

19. The apparatus of claim 18 wherein said comparison means further comprises:
   a SDBCNT counter connected to said data buffer for containing a SDBCNT value representing the number of data bytes stored in said data buffer;
   a third input connected to said SDBCNT counter for receiving said SDBCNT value;
   a fourth comparitor having a first input connected to said first input, a second input connected to the third input of said comparison means, and having an output which has a first, true, state for indicating when said SDBCNT value is equal to or greater than said DIB value and a second, false, state for indication when said SDBCNT value is not equal to or greater than said DIB value; and
   data frame transmission starting means connected to the output of said fourth comparitor for starting the transmission of a data frame when the output of said fourth comparitor is in its first, true, state.

20. The apparatus of claim 19 wherein said comparison means further comprises:
   a fifth comparitor having a first input connected to the second input of said comparison means and a second input connected to the third input of said comparison means and having an output which has a first, true, state when said SDBCT value is equal to or greater than said request count value and a second, false, state when said SDBCT value is not equal to or greater than said request count value;
   the output of said fifth comparitor being connected to said data frame transmission starting means for starting the transmission of a data frame when the output of said fifth comparitor is in its first, true, state.

21. The apparatus of claim 20 wherein said comparison means further comprises:
   a data length counter connected to the first input of said comparison means and said microprocessor, said data length counter being loadable from said first input and being decremented by said microprocessor for each data byte transferred by said transfer apparatus; and
   a frame termination means for appending a trailer on and terminating frame transmission to said I/O device when the contents of said data length counter is equal to zero.

22. The apparatus of claim 21 wherein said frame termination means is further connected to said request counter for appending a trailer on and terminating frame transmission when the contents of said request counter is equal to zero.

23. The apparatus of claim 22 wherein said frame termination means is further connected to the third input of said comparison means for appending a trailer on and terminating frame transmission to said I/O device when the contents of said SDBCT counter is equal to zero.

* * * * *